US009986526B2

(12) United States Patent
Khandekar et al.

(10) Patent No.: US 9,986,526 B2
(45) Date of Patent: May 29, 2018

(54) POSITIONING IN THE PRESENCE OF PASSIVE DISTRIBUTED ELEMENTS

(71) Applicant: QUALCOMM Incorporated, San Diego, CA (US)

(72) Inventors: Aamod Dinkar Khandekar, San Diego, CA (US); Ravi Palanki, San Diego, CA (US); Ashwin Sampath, Skillman, NJ (US); Naga Bhushan, San Diego, CA (US); Raja Sekhar Bachu, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/063,159

(22) Filed: Mar. 7, 2016

(65) Prior Publication Data

US 2016/0192317 A1   Jun. 30, 2016

Related U.S. Application Data

(62) Division of application No. 12/822,112, filed on Jun. 23, 2010, now Pat. No. 9,279,879.

(Continued)

(51) Int. Cl.
*H04W 64/00* (2009.01)
*H04B 7/15* (2006.01)
(Continued)

(52) U.S. Cl.
CPC ......... *H04W 64/003* (2013.01); *G01S 5/0063* (2013.01); *G01S 5/0081* (2013.01);
(Continued)

(58) Field of Classification Search
None
See application file for complete search history.

(56) References Cited

U.S. PATENT DOCUMENTS 5,263,177 A   11/1993  Schieve et al.
6,101,176 A    8/2000  Honkasalo et al.
(Continued)

FOREIGN PATENT DOCUMENTS

CN   1867196 A   11/2006
CN   1902838 A    1/2007
(Continued)

OTHER PUBLICATIONS

3GPP RAN WG1 #57bis R1-092305, "Positioning Support for Distributed Network Elements", LG-Nortel, pp. 103, Jun. 29-Jul. 3, 2009.

(Continued)

*Primary Examiner* — Gary Mui
(74) *Attorney, Agent, or Firm* — Seyfarth Shaw LLP

(57) ABSTRACT

Systems and methodologies are described that facilitate transmitting positioning reference signals (PRS) differently for passive distributed elements. PRSs for passive distributed elements can be transmitted over disparate resources than those utilized for PRSs at a related access point, using different symbol sequences, and/or the like. In this regard, wireless devices can differentiate between PRSs from access points and those from passive distributed elements, which can mitigate confusion for processes involving such RSs, such as position determining. Alternatively, passive distributed elements can refrain from transmitting PRSs, and a corresponding access point can indicate to wireless devices to only determine positioning based on PRSs. Thus, the wireless devices can utilize the PRSs transmitted from the access point (and not other reference signals transmitted from the passive distributed element) to determine a position.

21 Claims, 17 Drawing Sheets

Related U.S. Application Data

(60) Provisional application No. 61/220,987, filed on Jun. 26, 2009.

(51) Int. Cl.
*G01S 5/00* (2006.01)
*G01S 5/02* (2010.01)

(52) U.S. Cl.
CPC .......... *G01S 5/0236* (2013.01); *G01S 5/0273* (2013.01); *H04B 7/15* (2013.01)

(56) References Cited

U.S. PATENT DOCUMENTS

| | | |
|---|---|---|
| 6,108,558 A | 8/2000 | Vanderspool |
| 6,157,842 A | 12/2000 | Karlsson et al. |
| 6,415,155 B1 | 7/2002 | Koshima et al. |
| 6,424,819 B1 | 7/2002 | Yan |
| 6,498,585 B2 | 12/2002 | Jandrell |
| 6,501,955 B1 | 12/2002 | Durrant et al. |
| 6,564,064 B1 | 5/2003 | Ciganer et al. |
| 6,753,812 B2 | 6/2004 | Rabinowitz et al. |
| 6,785,321 B1 | 8/2004 | Yang et al. |
| 6,831,911 B1 | 12/2004 | Sridharan et al. |
| 6,909,902 B1 | 6/2005 | Sawada et al. |
| 7,016,688 B2 | 3/2006 | Simic et al. |
| 7,139,580 B2 | 11/2006 | Stein et al. |
| 7,881,249 B2 | 2/2011 | Wheatley |
| 8,493,267 B2 | 7/2013 | Wengler et al. |
| 8,929,826 B2 | 1/2015 | Siomina et al. |
| 9,204,418 B2 | 12/2015 | Siomina et al. |
| 9,482,742 B1 | 11/2016 | Fischer |
| 2002/0097181 A1 | 7/2002 | Chou et al. |
| 2003/0008663 A1 | 1/2003 | Stein et al. |
| 2003/0008664 A1 | 1/2003 | Stein et al. |
| 2003/0083008 A1 | 5/2003 | Baker et al. |
| 2004/0176029 A1 | 9/2004 | Soliman |
| 2004/0219930 A1 | 11/2004 | Lin |
| 2004/0266338 A1 | 12/2004 | Rowitch |
| 2005/0130672 A1 | 6/2005 | Dean et al. |
| 2007/0014252 A1 | 1/2007 | Chung et al. |
| 2008/0254743 A1 | 10/2008 | Nishikawa et al. |
| 2009/0053993 A1 | 2/2009 | Baker et al. |
| 2009/0061899 A1 | 3/2009 | Hwang et al. |
| 2009/0143018 A1 | 6/2009 | Anderson et al. |
| 2009/0203386 A1 | 8/2009 | Edge et al. |
| 2010/0118706 A1* | 5/2010 | Parkvall ............... H04L 5/0023 370/241 |
| 2010/0165882 A1 | 7/2010 | Palanki et al. |
| 2010/0167743 A1 | 7/2010 | Palanki et al. |
| 2010/0195566 A1 | 8/2010 | Krishnamurthy et al. |
| 2010/0260154 A1* | 10/2010 | Frank ..................... G01S 5/10 370/336 |
| 2010/0271965 A1* | 10/2010 | Siomina ............... H04L 5/0048 370/252 |
| 2010/0273506 A1* | 10/2010 | Stern-Berkowitz ... G01S 5/0009 455/456.1 |
| 2010/0317351 A1* | 12/2010 | Gerstenberger ........ H04W 8/26 455/443 |
| 2010/0323718 A1 | 12/2010 | Jen |
| 2011/0105144 A1 | 5/2011 | Siomina et al. |
| 2011/0117925 A1 | 5/2011 | Sampath et al. |
| 2011/0117926 A1 | 5/2011 | Hwang et al. |
| 2011/0124347 A1 | 5/2011 | Chen et al. |
| 2011/0149887 A1 | 6/2011 | Khandekar et al. |
| 2011/0149903 A1 | 6/2011 | Krishnamurthy et al. |
| 2011/0159901 A1 | 6/2011 | Frenger et al. |
| 2011/0176440 A1 | 7/2011 | Frank et al. |
| 2011/0286349 A1* | 11/2011 | Tee ...................... H04W 64/00 370/252 |
| 2012/0027110 A1 | 2/2012 | Han et al. |
| 2012/0040696 A1 | 2/2012 | Siomina et al. |
| 2012/0046047 A1 | 2/2012 | Popovic et al. |
| 2012/0083278 A1 | 4/2012 | Kazmi et al. |
| 2012/0094691 A1* | 4/2012 | Chen ..................... G01S 5/02 455/456.1 |
| 2012/0108270 A1 | 5/2012 | Kazmi et al. |
| 2012/0189041 A1 | 7/2012 | Ko et al. |
| 2012/0231809 A1 | 9/2012 | Siomina et al. |
| 2012/0252487 A1 | 10/2012 | Siomina et al. |
| 2013/0023285 A1 | 1/2013 | Markhovsky et al. |
| 2013/0194931 A1 | 8/2013 | Lee et al. |
| 2014/0087754 A1 | 3/2014 | Siomina et al. |
| 2014/0176366 A1 | 6/2014 | Fischer et al. |
| 2014/0286280 A1 | 9/2014 | Seo et al. |
| 2015/0016239 A1 | 1/2015 | Yi et al. |
| 2015/0195770 A1 | 7/2015 | Sun et al. |
| 2015/0198696 A1 | 7/2015 | Liu |
| 2015/0282114 A1 | 10/2015 | Zhao et al. |
| 2016/0195601 A1 | 7/2016 | Siomina et al. |
| 2017/0019875 A1 | 1/2017 | Fischer |
| 2017/0359794 A1 | 12/2017 | Fischer |

FOREIGN PATENT DOCUMENTS

| | | |
|---|---|---|
| EP | 0930514 A2 | 7/1999 |
| EP | 1742080 A1 | 1/2007 |
| JP | 2002101445 | 4/2002 |
| JP | 2003035762 A | 2/2003 |
| JP | 2004108903 A | 4/2004 |
| JP | 2006325218 A | 11/2006 |
| JP | 2007537613 A | 12/2007 |
| JP | 2012530394 A | 11/2012 |
| JP | 2016502651 A | 1/2016 |
| TW | 201116112 A | 5/2011 |
| TW | 201235688 A | 9/2012 |
| WO | 2000051392 | 8/2000 |
| WO | 2002087275 | 10/2002 |
| WO | 2004077698 A1 | 9/2004 |
| WO | 2004079387 A2 | 9/2004 |
| WO | 2004080105 A2 | 9/2004 |
| WO | 2004095733 A2 | 11/2004 |
| WO | 2005062066 A2 | 7/2005 |
| WO | 2005103753 A1 | 11/2005 |
| WO | 2006031034 A1 | 3/2006 |
| WO | 2006076600 A1 | 7/2006 |
| WO | WO-2008100351 A2 | 8/2008 |
| WO | 2009009511 A2 | 1/2009 |
| WO | 09079103 | 6/2009 |
| WO | 2009070464 A1 | 6/2009 |
| WO | 2010144765 A1 | 12/2010 |
| WO | 2011056119 A1 | 5/2011 |
| WO | WO-2011139201 A1 | 11/2011 |
| WO | WO-2012067328 A1 | 5/2012 |
| WO | 2014064656 A2 | 5/2014 |
| WO | WO-2014086409 A1 | 6/2014 |

OTHER PUBLICATIONS

European Search Report—EP13183510—Search Authority—The Hague—dated Nov. 25, 2013.
International Search Report and Written Opinion—PCT/US2010/040090, International Search Authority—European Patent Office—dated Jan. 31, 2011.
Partial International Search Report—PCT/US2010/040090, International Search Authority—European Patent Office—dated Nov. 12, 2010.
Vodafone Group, et al., "Tracking Areas in eNB", 3GPP TSG RAN WG3 #56, R3-071030, 3 Pages.
3GPP, "3rd Generation Partnership Project; Technical Specification Group Radio Access Network; Coordinated multi-point operation for LTE physical layer aspects (Release 11)", 3GPP TR 36.819 V11.2.0 (Sep. 2013), 70 pages.
3GPP, "3rd Generation Partnership Project; Technical Specification Group Radio Access Network; Evolved Universal Terrestrial Radio Access (E-UTRA); LTE Positioning Protocol (LPP) (Release 12)", 3GPP TS 36.355 V12.2.0 (Jun. 2014), 126 pages.
3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.3.0 (Sep. 2014), 124 pages.

(56) References Cited

OTHER PUBLICATIONS

3GPP, "3rd Generation Partnership Project; Technical Specification Group Radio Access Network; Evolved Universal Terrestrial Radio Access (E-UTRA); Physical layer; Measurements (Release 12)", 3GPP TS 36.214 V12.0.0 (Sep. 2014), 14 pages.

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.5.0 (Sep. 2014), 877 pages.

3GPP, "3rd Generation Partnership Project; Technical Specification Group Radio Access Network; Further Advancements for E-UTRA Physical Layer Aspects (Release 9)", 3GPP TR 36.814 V1.7.0(Feb. 2010), 85 pages.

3GPP, "3rd Generation Partnership Project; Technical Specification Group Radio Access Network; Small cell enhancements for E-UTRA and E-UTRAN—Physical layer aspects (Release 12)", 3GPP TR 36.872 V12.1.0 (Dec. 2013), 100 pages.

3GPP, "3rd Generation Partnership Project; Technical Specification Group Radio Access Network; Study on 3D channel model for LTE (Release 12)", 3GPP TR 36.873 V12.0.0 (Sep. 2014), 42 pages.

3GPP, "3rd Generation Partnership Project; Technical Specification Group Radio Access Network; Study on Indoor Positioning Enhancements for UTRA and LTE (Release 13)", 3GPP TR 37.857 V0.0.2 (Oct. 2014), 8 pages.

3GPP, "3rd Generation Partnership Project; Technical Specification Group Services and System Aspects; Location Services (LCS); Service description; Stage 1 (Release 12)", 3GPP TS 22.071 V12.0.0 (Oct. 2014), 50 pages.

"3rd Generation Partnership Project; Technical Specification Group Services and System Aspects; Vocabulary for 3GPP Specifications," Release 12, 3 GPP TR 21.905, Version 12.0.0, Jun. 2013, 64 pp.

Intel Corporation, "OTDOA Performance in Shared Cell ID Scenario", 3GPP TSG RAN WG1 Meeting #80bis, R1-151444, Belgrade, Serbia, Apr. 20-24, 2015, 4 pages.

NextNav, "Revised SID: Study on Indoor Positioning Enhancements for UTRA and LTE", 3GPP TSG RAN Meeting #65, RP-141102, Edinburgh, Scotland, Sep. 9-12 2014, 7 pages.

Nokia Networks, "Potential enhancements for OTDOA", 3GPP TSG-RAN WG1 #80b, R1-151833, Belgrade, Serbia, Apr. 21-24, 2015, 2 pages.

NTT Docomo, "Chairman's Note on Simulation Assumptions for UTDOA", 3GPP TSG RAN WG1 #61 Meeting, R1-103410, Montreal, Canada, May 10-14, 2010, 4 pages.

Qualcomm Incorporated, "Indoor Positioning Simulation Results", 3GPP TSG-RAN WG1 Meeting #80bis, R1-152192, Belgrade, Serbia, Apr. 20-24, 2015, 16 pages.

Qualcomm Incorporated, "OTDOA Positioning Enhancements", 3GPP TSG-RAN WG1 Meeting #80bis, R1-151422, Belgrade, Serbia, Apr. 20-24, 2015,10 pages.

Session Chairman (Qualcomm Inc.), "Summary of Ad-hoc session on Study on Indoor Positioning Enhancements for UTRA and LTE", 3GPP TSG RAN WG1 Meeting #80bis, R1-152378, Belgrade, Serbia, Apr. 20-24, 2015, 3 pages.

* cited by examiner

POSITIONING IN THE PRESENCE OF PASSIVE DISTRIBUTED ELEMENTS

CROSS-REFERENCE

This application is a divisional of U.S. application Ser. No. 12/822,112, filed Jun. 23, 2010, and entitled "POSITIONING IN THE PRESENCE OF PASSIVE DISTRIBUTED ELEMENTS," and U.S. Provisional Application Ser. No. 61/220,987, filed Jun. 26, 2009, and entitled "POSITIONING IN THE PRESENCE OF PASSIVE DISTRIBUTED ELEMENTS," the entireties of which are incorporated herein by reference.

BACKGROUND

I. Field

The present disclosure relates generally to wireless communications and more specifically to transmitting reference signals to one or more devices.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc., and can use one or more protocols, such as high-speed uplink packet access (HSUPA), single carrier HSUPA (SC-HSUPA), dual carrier HSUPA (DC-HSUPA), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating utilizing different transmission parameters for positioning reference signals (PRS) of passive distributed elements, as compared to those for a related access point. For example, passive distributed elements can transmit PRSs over disparate resources than those utilized by an access point to transmit PRSs and/or using different symbol sequences within the resources. In addition, the access point can provision the related resources, or symbol sequences, to one or more wireless devices to facilitate processing the PRSs. In another example, passive distributed elements can refrain from transmitting PRSs such that wireless devices can only measure PRSs from the access point. In this example, wireless devices can be signaled to measure PRSs only in determining positioning to mitigate additionally determining position from CRSs of the access point transmitted by the passive distributed elements.

According to an aspect, a method is provided that includes receiving a PRS from an access point and receiving a disparate PRS from a passive distributed element employed by the access point. The method further includes associating the PRS with the access point and the disparate PRS with the passive distributed element.

Another aspect relates to a wireless communications apparatus. The wireless communications apparatus can include at least one processor configured to obtain a PRS from an access point and obtain a disparate PRS from a passive distributed element related to the access point. The at least one processor is further configured to identify the PRS as related to the access point and the disparate PRS as related to the passive distributed element. The wireless communications apparatus also comprises a memory coupled to the at least one processor.

Yet another aspect relates to an apparatus. The apparatus includes means for receiving a PRS from an access point and a disparate PRS from a passive distributed element employed by the access point. The apparatus also includes means for associating the PRS with the access point and the disparate PRS with the passive distributed element.

Still another aspect relates to a computer program product, which can have a computer-readable medium including code for causing at least one computer to obtain a PRS from an access point and code for causing the at least one computer to obtain a disparate PRS from a passive distributed element related to the access point. The computer-readable medium can also comprise code for causing the at least one computer to identify the PRS as related to the access point and the disparate PRS as related to the passive distributed element.

Moreover, an additional aspect relates to an apparatus including a reference signal (RS) receiving component that obtains a PRS from an access point and a disparate PRS from a passive distributed element employed by the access point. The apparatus further includes an RS source determining component that associates the PRS with the access point and the disparate PRS with the passive distributed element.

According to another aspect, a method is provided that includes receiving an indicator specifying one or more signal types receivable from one or more access points or passive distributed elements for determining a position. The method also includes measuring signals of the one or more signal types to determine positioning data.

Another aspect relates to a wireless communications apparatus. The wireless communications apparatus can include at least one processor configured to obtain an indicator that specifies one or more signal types receivable from one or more access points or passive distributed elements for determining a position. The at least one processor is further configured to process signals of the one or more signal types to determine positioning data. The wireless communications apparatus also comprises a memory coupled to the at least one processor.

Yet another aspect relates to an apparatus. The apparatus includes means for receiving an indicator that specifies one or more signal types receivable from one or more access points or passive distributed elements for determining a position. The apparatus also includes means for measuring signals of the one or more signal types to determine positioning data.

Still another aspect relates to a computer program product, which can have a computer-readable medium including code for causing at least one computer to obtain an indicator that specifies one or more signal types receivable from one or more access points or passive distributed elements for determining a position. The computer-readable medium can also comprise code for causing the at least one computer to process signals of the one or more signal types to determine positioning data.

Moreover, an additional aspect relates to an apparatus including an assistance data receiving component that obtains an indicator that specifies one or more signal types receivable from one or more access points or passive distributed elements for determining a position. The apparatus can further include a position determining component that measures signals of the one or more signal types to discern positioning data.

In accordance with another aspect, a method is provided that includes generating one or more parameters for transmitting a PRS and generating one or more disparate parameters related to a disparate PRS, wherein the disparate PRS relates to a passive distributed element. The method further includes transmitting the PRS in a wireless network according to the one or more parameters.

Another aspect relates to a wireless communications apparatus. The wireless communications apparatus can include at least one processor configured to determine one or more parameters for transmitting a PRS and determine one or more disparate parameters for transmitting a disparate PRS, wherein the disparate PRS relates to a passive distributed element. The at least one processor is further configured to transmit the PRS according to the one or more parameters. The wireless communications apparatus also comprises a memory coupled to the at least one processor.

Yet another aspect relates to an apparatus. The apparatus includes means for generating one or more parameters for transmitting a PRS and one or more disparate parameters for transmitting a disparate PRS, wherein the disparate PRS relates to a passive distributed element. The apparatus also includes means for transmitting the PRS in a wireless network according to the one or more parameters.

Still another aspect relates to a computer program product, which can have a computer-readable medium including code for causing at least one computer to determine one or more parameters for transmitting a PRS and code for causing the at least one computer to determine one or more disparate parameters for transmitting a disparate PRS, wherein the disparate PRS relates to a passive distributed element. The computer-readable medium can also comprise code for causing the at least one computer to transmit the PRS according to the one or more parameters.

Moreover, an additional aspect relates to an apparatus including a component that generates one or more parameters for transmitting a PRS and one or more disparate parameters for transmitting a disparate PRS, wherein the disparate PRS relates to a passive distributed element. The apparatus can further include a transmitting component that transmits the PRS in a wireless network according to the one or more parameters.

According to yet another aspect, a method is provided that includes transmitting an indication to one or more wireless devices related to one or more signal types receivable for computing positioning data. The method further includes transmitting a signal of the one or more signal types to the one or more wireless devices.

Another aspect relates to a wireless communications apparatus. The wireless communications apparatus can include at least one processor configured to provide an indication to one or more wireless devices related to one or more signal types for computing positioning data. The at least one processor is further configured to transmit a signal of the one or more signal types to the one or more wireless devices. The wireless communications apparatus also comprises a memory coupled to the at least one processor.

Yet another aspect relates to an apparatus. The apparatus includes means for transmitting an indication to one or more wireless devices related to one or more signal types receivable for computing positioning data. The apparatus also includes means for transmitting a signal of the one or more signal types to the one or more wireless devices.

Still another aspect relates to a computer program product, which can have a computer-readable medium including code for causing at least one computer to provide an indication to one or more wireless devices related to one or more signal types for computing positioning data. The computer-readable medium can also comprise code for causing the at least one computer to transmit a signal of the one or more signal types to the one or more wireless devices.

Moreover, an additional aspect relates to an apparatus including an assistance data providing component that transmits an indication to one or more wireless devices related to one or more signal types receivable for computing positioning data. The apparatus can further include a transmitting component that communicates a signal of the one or more signal types to the one or more wireless devices.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
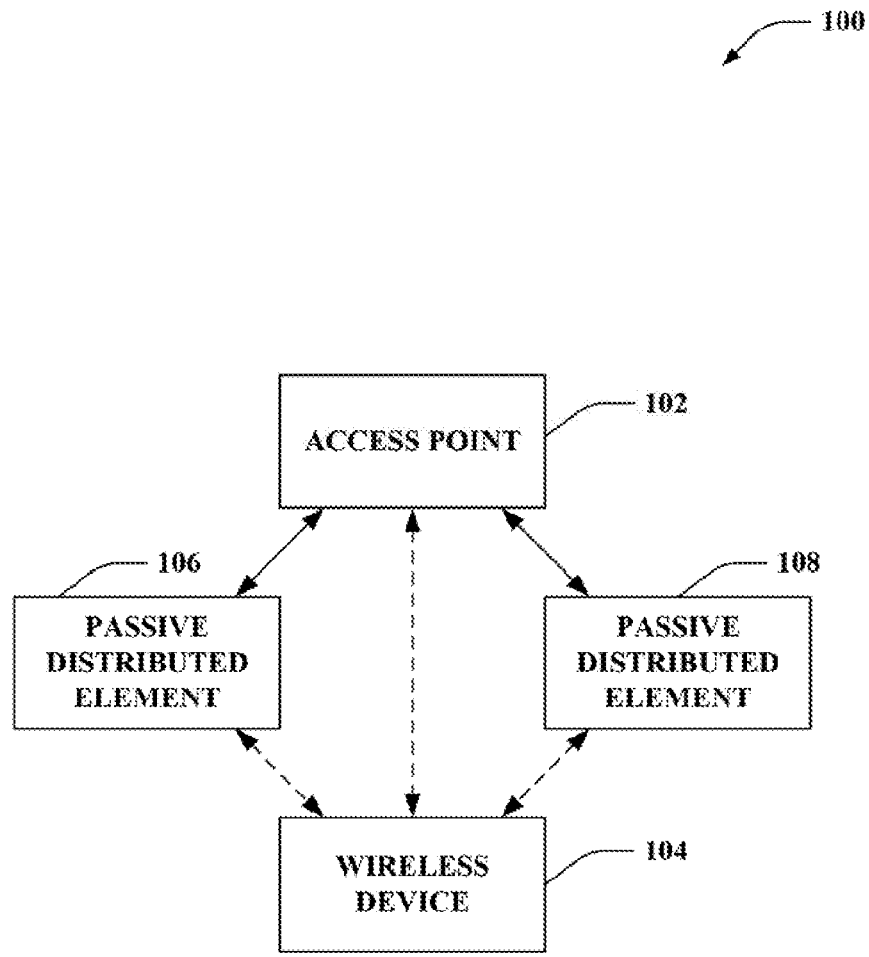
FIG. 1 is a block diagram of a system for providing passive distributed elements to increase access point communication range.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a wireless device, a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB) or other Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or that they may not include all of the devices, components, modules etc. discussed in connection with the figures. A combination of these approaches can also be used.

Referring now to the drawings, FIG. 1 illustrates an example system 100 that facilitates providing wireless network access to one or more devices using one or more passive distributed elements. System 100 includes an access point 102 that provides a wireless device 104 with access to a core network (not shown). For example, access point 102 can provide wireless network access to wireless device 104 directly and/or through one or more passive distributed elements 106 and/or 108, which can be wired and/or wirelessly attached to access point 102, for example. Access point 102 can be substantially any device that provides access to one or more network components, such as a macrocell access point, femtocell or picocell access point, eNB, mobile base station, relay node, a portion thereof, and/or the like. Wireless device 104 can be substantially any device that receives access to a wireless network, such as a mobile device, UE, modem (or other tethered device), a portion thereof, etc. Passive distributed elements 106 and 108 can be radio frequency (RF) repeaters, remote radio heads (RRH), a portion thereof, or substantially any device that remotely transmits signals from an access point.

According to an example, passive distributed elements 106 and 108, as described, can transmit signals transmitted by access point 102 to improve hearability thereof. Thus, for example, where access point 102 transmits a PRS, CRS, etc., passive distributed elements 106 and 108 can transmit substantially the same PRS, CRS, etc. Where wireless device 104 is attempting to determine its position, PRS, CRS, etc. received from passive distributed elements 106 and 108 can cause incorrect position determining since wireless device 104 associates the received PRS, CRS, etc. with the location of access point 102. Access point 102, for example, can control transmissions at the passive distributed elements 106 and 108 such that access point 102 can cause passive distributed elements 106 and 108 to transmit different signals during different time periods. In this regard, for example, passive distributed elements 106 and 108 can transmit PRS, CRS, etc. differently from access point 102 to mitigate confusion at wireless device 104.

In one example, passive distributed elements 106 and 108 can transmit PRSs over disparate resources from those utilized by access point 102 and/or other passive distributed elements. In this example, access point 102 can additionally provision wireless device 104 with location information regarding the passive distributed elements 106 and 108 along with one or more parameters regarding the resources utilized by passive distributed elements 106 and 108 for transmitting PRSs, an identification related to the PRSs transmitted by passive distributed elements 106 and 108, and/or the like. It is to be appreciated that access point 102 can provide similar information about its location, PRS parameters, etc. In this regard, wireless device 104 can utilize at least a PRS transmitted by one or more of the passive distributed elements 106 and/or 108, or access point 102, to determine positioning based on the related location information. Additionally or alternatively, passive distributed elements 106 and 108 can transmit PRSs using disparate PRS sequences to differentiate from PRSs transmitted by access point 102 or other passive distributed elements. Similarly, in this example, access point 102 can provision sequence information to wireless device 104 to facilitate identifying the PRSs and associating with location information.

In either case, it is to be appreciated that access point 102 can additionally signal assigned resources and/or PRS sequences to passive distributed elements 106 and 108 or cause passive distributed elements 106 and 108 to transmit corresponding PRSs over the resources or using the PRS sequences. In one example, access point 102 can determine a set of resources and/or a PRS sequence for the passive distributed elements 106 and 108 using a random function, a pseudo-random function that factors an identifier of the passive distributed element, generated sets of resources according to a hardcoding, specification, configuration, etc., and/or the like.

In another example, passive distributed elements 106 and 108 refrain from transmitting PRSs to mitigate confusion in determining positioning. Passive distributed elements 106 and 108, however, can still transmit CRSs for various purposes (e.g., to facilitate channel estimation, etc.). Wireless device 104, in this example, can utilize CRSs in addition or alternatively to PRSs to determine positioning, which can lead to incorrect results as described previously. Thus, where passive distributed elements 106 and 108 are not to be used for positioning, access point 102 can provision an indicator to wireless device 104 to only measure PRSs to determine location. In this regard, wireless device 104 can ignore CRSs transmitted from passive distributed elements 106 and 108 (and access point 102) when determining positioning. In this example, wireless device 104 measures only the PRS transmitted from access point 102 (and/or PRSs from other access points) to determine positioning.

Figure 2:
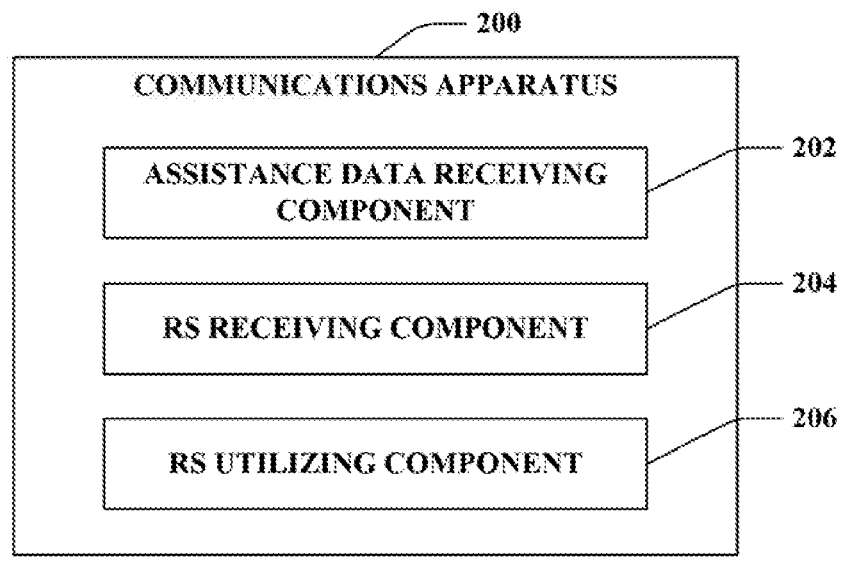
FIG. 2 is an illustration of an example communications apparatus for use within a wireless communications environment.

Referring next to FIG. 2, a communications apparatus 200 that can participate in a wireless communications network is illustrated. The communications apparatus 200 can be a wireless terminal, mobile device, access point, a portion thereof, or substantially any device that can receive RSs in a wireless network. The communications apparatus 200 can include an assistance data receiving component 202 that obtains assistance data related to RSs transmitted in a wireless network, an RS receiving component 204 that can obtain one or more RSs from an access point and/or related passive distributed elements (not shown), and an RS utilizing component 206 that can process at least one of the one or more obtained RSs.

According to an example, assistance data receiving component 202 can obtain assistance data from an access point related to utilizing RSs transmitted by the access point and/or one or more related passive distributed elements. For example, assistance data receiving component 202 can obtain data related to location of the passive distributed elements, data related to identifying features of RSs transmitted by the passive distributed elements (e.g., resources utilized, RS sequences utilized, identifiers present in the RSs, etc.), indicators of types of RSs that can be utilized for performing computations at communications apparatus 200, and/or the like. In addition, RS receiving component 204 can obtain RSs from the access point and/or the one or more passive distributed elements. RS utilizing component 206 can process and utilize the RSs according to the assistance data, for example.

For example, where the assistance data identifies features of RSs transmitted by passive distributed elements and/or the corresponding access point, RS utilizing component 206 can associate a received RS with a passive distributed element and/or access point. In addition, where the assistance data includes locations of the passive distributed elements and/or the access point, RS utilizing component 206 can further determine a location of the passive distributed elements and/or access point associated with the received RS. RS utilizing component 206, for example, can compute a position of communications apparatus 200 based at least in part on the received signal strength of the received RS and a location of the corresponding passive distributed elements and/or access point.

In another example, where the assistance data includes indications specifying types of RSs that can be utilized for certain computations, RS utilizing component 206 can ignore other RSs. Thus, in an example, an access point can transmit PRSs without allowing passive distributed elements to transmit the same, as described above. Thus, the assistance data can specify to only measure PRSs for determining positioning. This can be a one bit indicator, in one example, where the other bit value indicates substantially any RS can be utilized for positioning. As described, when the assistance data indicates only measuring PRS for positioning, RS utilizing component 206 can ignore CRSs or other RSs received from the passive distributed elements and/or access point. Thus, in this example as well, positioning can be determined without confusion caused from passive distributed elements transmitting RSs related to the access point. When the assistance data indicates that substantially any RS can be utilized, on the other hand, RS utilizing component 206 can process substantially any RS from the related access point (and/or potential passive distributed elements) to determine positioning. In one example, however, this indicator can be specified where the access point does not leverage passive distributed elements.

Figure 3:
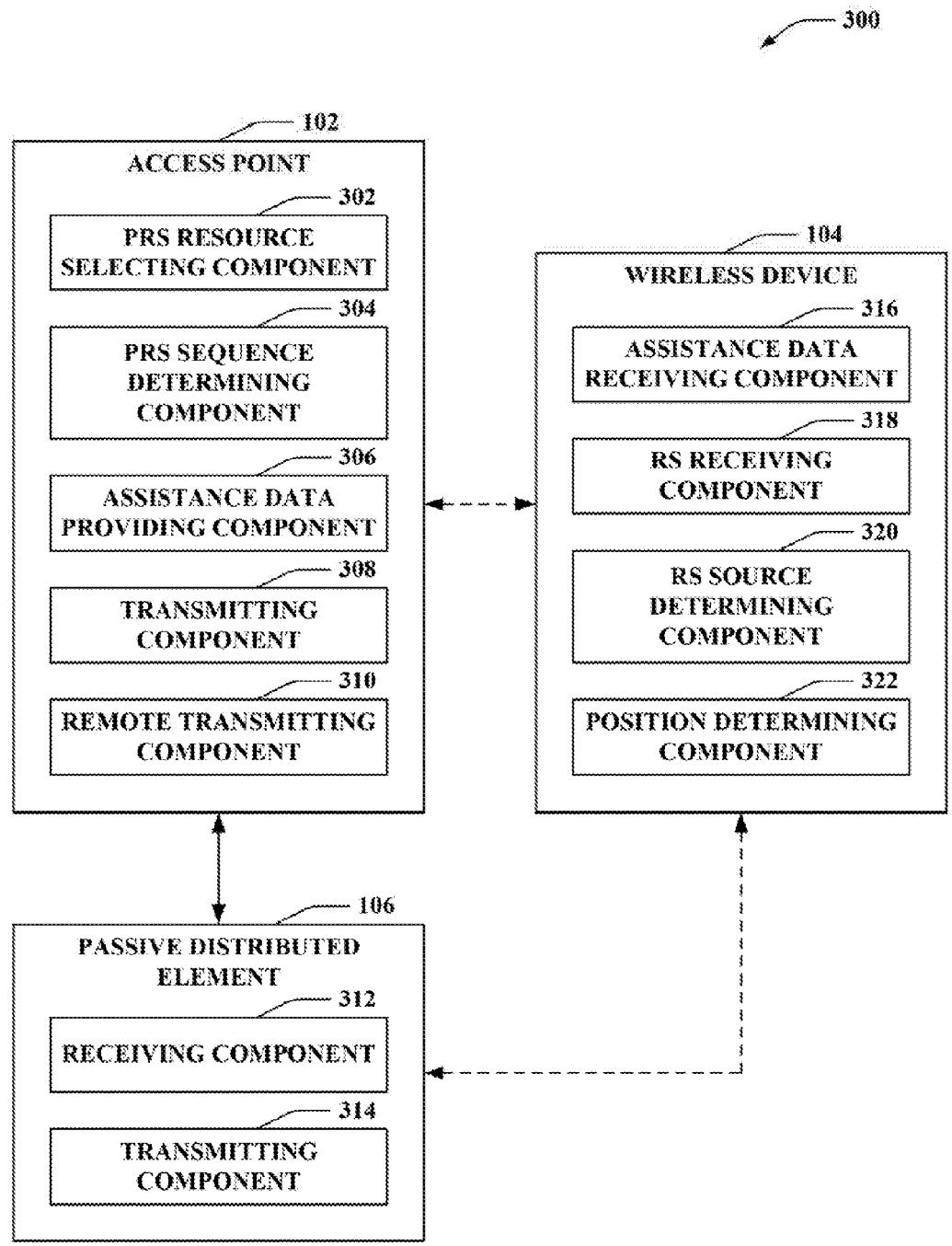
FIG. 3 illustrates an example wireless communication system for transmitting positioning reference signals (PRS) related to passive distributed elements differently than those for a corresponding access point.

Now referring to FIG. 3, illustrated is a wireless communications system 300 that facilitates transmitting PRSs related to passive distributed elements differently from PRSs transmitted by a related access point. System 300 includes an access point 102 that provides one or more wireless devices, such as wireless device 104, with access to a core network (not shown). Moreover, access point 102 can be a macrocell access point, femtocell access point, picocell access point, mobile base station, a portion thereof, and/or substantially any device that provides wireless network access. In addition, for example, wireless device 104 can be a UE, modem (or other tethered device), a portion thereof, and/or substantially any device that receives access to a wireless network. In addition, access point 102 can utilize one or more passive distributed elements, such as passive distributed element 106 to increase signal power. Passive distributed element 106 can be an RF repeater, RRH, and/or the like, as described.

Access point 102 can comprise a PRS resource selecting component 302 that determines one or more resources for transmitting a PRS related to the access point or one or more passive distributed elements, as well as a PRS sequence determining component 304 that discerns one or more PRS sequences for transmitting a PRS related to the access point or one or more passive distributed elements. Access point 102 also includes an assistance data providing component 306 that formulates and transmits assistance data related to PRSs of the access point and the one or more passive distributed elements, a transmitting component 308 that transmits PRSs and/or other data to a wireless device, and a remote transmitting component 310 that causes one or more passive distributed elements to transmit a PRS or other data to a wireless device.

Passive distributed element 106 can include a receiving component 312 that obtains signals from an access point 102 (e.g., dedicated or broadcast over a wired or wireless connection) and a transmitting component 314 that transmits the signals received from the access point 102. Wireless device 104 comprises an assistance data receiving component 316 that obtains assistance data related to one or more access points and corresponding passive distributed elements and an RS receiving component 318 that obtains an RS from the one or more access points or corresponding passive distributed elements. Wireless device 104 can also include an RS source determining component 320 that discerns an access point or passive distributed element from which one or more RSs are received and a position determining component 322 that computes a position of the wireless device 104 based at least in part on the received RS(s).

According to an example, PRS resource selecting component 302 can determine a set of resources (e.g., time/frequency resources, OFDM symbols or portions thereof, etc.) or one or more related parameters to utilize for transmitting PRSs related to access point 102. In addition, PRS resource selecting component 302 can select disparate resources for communicating PRSs related to passive distributed element 106. For example, PRS resource selecting component 302 can determine resources for access point 102 and passive distributed elements 106 (as well as other passive distributed elements) according to a pattern or sequence, randomly, pseudo-randomly (e.g., based on a function of an identifier, where an identifier for the passive distributed element 106 can be assigned by access point 102), and/or the like. In addition, the pattern, sequence, or pseudo-random function can be defined as part of a hard-coding, specification, configuration, and/or the like. As described, assigning varying resources for the PRSs can facilitate differentiating PRSs transmitted by access point 102 from those transmitted by passive distributed element 106.

Additionally or alternatively, PRS sequence determining component 304 can generate or otherwise discern disparate symbol sequences (e.g., 01-DM symbol sequences) or one or more related parameters to utilize in transmitting PRSs for access point 102 and passive distributed element 106. In either case, assistance data providing component 306 can formulate information regarding access point 102 and/or passive distributed element 106, such as location, PRS resources utilized, PRS sequences utilized, identifiers in the PRS, and/or other information to facilitate identifying PRSs transmitted by access point 102 and passive distributed element 106. Similarly, as described, the PRS sequences can be assigned according to a pattern or sequence, randomly, pseudo-randomly based on identifier, and/or the like. Assistance data providing component 306 can transmit the assistance data to wireless device 104, which can include broadcasting from access point 102, sending as a dedicated signal to wireless device 104, and/or the like.

Assistance data receiving component 316 can obtain the assistance data and store the assistance data for subsequent utilization in detecting PRSs from access point 102 and/or passive distributed element 106. In an example, transmitting component 308 can transmit a PRS related to access point 102 over resources determined for access point 102 by PRS resource selecting component 302. Similarly, remote transmitting component 310 can cause passive distributed element 106 to transmit a PRS related thereto over resources determined for the passive distributed element 106 by PRS resource selecting component 302. Receiving component 312 can obtain the PRS, and transmitting component 314 can transmit the PRS over the resources. In both cases, RS receiving component 318 can obtain at least one of the PRSs over the corresponding resources. RS source determining component 320 can discern whether a PRS is transmitted by access point 102 or passive distributed element 106 based at least in part on resources over which the PRS is received and the assistance data, as described.

Additionally or alternatively, transmitting component 308 can transmit a PRS related to access point 102 using a symbol sequence generated or otherwise determined by PRS sequence determining component 304. Similarly, remote transmitting component 310 can cause passive distributed element 106 to transmit a PRS related thereto over a symbol sequence discerned for it by PRS sequence determining component 304. Receiving component 312 can obtain the PRS that utilizes the symbol sequence, and transmitting component 314 can transmit the PRS using the symbol sequence for passive distributed element 106, as described. RS receiving component 318 can receive at least one of the PRSs, and RS source determining component 320 can similarly (or additionally) determine whether a PRS relates to access point 102 or passive distributed element 106 based at least in part on a received symbol sequence and the assistance data. In either case, once RS source determining component 320 discerns whether access point 102 or passive distributed element 106, position determining component 322 can determine a position of wireless device 104 based at least in part on a strength of the PRS and a location of the determined PRS source, for example.

Figure 4:
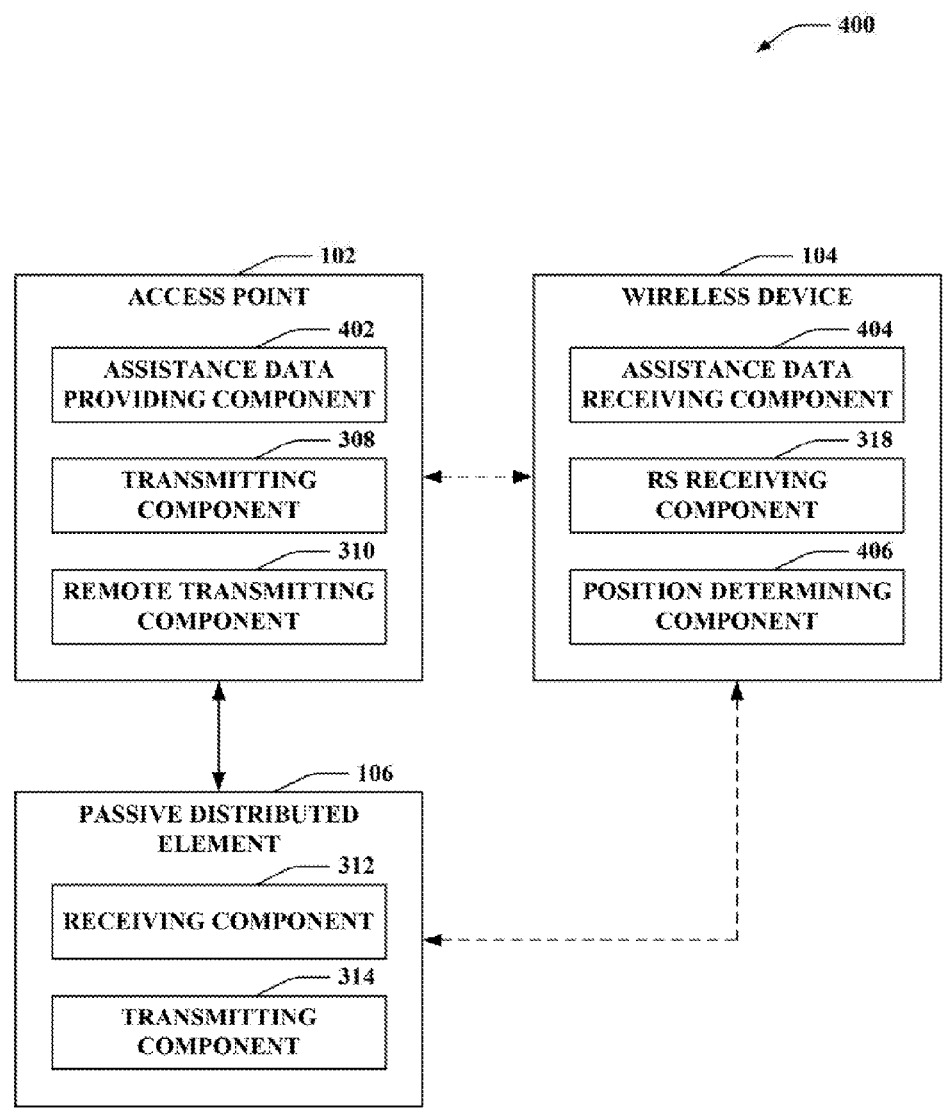
FIG. 4 illustrates an example wireless communication system for refraining from transmitting PRSs from passive distributed elements.

Turning to FIG. 4, illustrated is a wireless communications system 400 that facilitates processing RSs from access points that utilize passive distributed elements. System 400 includes an access point 102 that provides one or more wireless devices, such as wireless device 104, with access to a core network (not shown). Moreover, access point 102 can be a macrocell access point, femtocell access point, picocell access point, mobile base station, a portion thereof, and/or substantially any device that provides wireless network access. In addition, for example, wireless device 104 can be a UE, modem (or other tethered device), a portion thereof, and/or substantially any device that receives access to a wireless network. In addition, access point 102 can utilize one or more passive distributed elements, such as passive distributed element 106 to increase signal power. Passive distributed element 106 can be an RF repeater, RRH, and/or the like, as described.

Access point 102 can comprise an assistance data providing component 402 that generates and transmits assistance data related to RSs of an access point and/or one or more passive distributed elements employed by the access point, a transmitting component 308 that transmits RSs and/or other data to a wireless device, and a remote transmitting component 310 that causes one or more passive distributed elements to transmit an RS or other data to a wireless device. Passive distributed element 106 can include a receiving component 312 that obtains signals from an access point 102 (e.g., dedicated or broadcast over a wired or wireless connection) and a transmitting component 314 that transmits the signals received from the access point 102. Wireless device 104 comprises an assistance data receiving component 404 that obtains assistance data related to one or more access points and corresponding passive distributed elements, an RS receiving component 318 that obtains an RS from the one or more access points or corresponding passive distributed elements, and a position determining component 406 that computes a position of the wireless device 104 based at least in part on the received RS.

According to an example, access point 102 can transmit PRSs without causing passive distributed element 106 to transmit the same. Access point 102, however, can cause passive distributed element 106 to transmit CRSs to allow devices receiving from passive distributed element 106 to communicate with the passive distributed element 106 (e.g., perform channel estimation for signals received therefrom, etc.). In this example, access point 102 can notify wireless device 104 to not consider CRSs in determining position (e.g., since the CRS received from passive distributed element 106 relates to access point 102, and passive distributed element 106 is remotely located, as described). Thus, in this example, assistance data providing component 306 can transmit assistance data to wireless device 104 that indicates only PRSs are to be used in determining positioning. Assistance data receiving component 404 can obtain this indication for utilization in measuring PRSs for positioning.

In this regard, for example, transmitting component 308 can transmit a PRS related to access point 102, and remote transmitting component 310 can refrain from forwarding the PRS to passive distributed element 106 for transmitting. RS receiving component 318 can obtain the PRS. Position determining component 406, for example, can determine the PRS is, in fact, a PRS (and not a CRS or other RS) and can determine a position of the wireless device 104 based at least in part on the PRS. In addition, transmitting component 308 can transmit a CRS, and remote transmitting component 310 can cause passive distributed element 106 to transmit the CRS. Receiving component 312 can receive the CRS, and transmitting component 314 can transmit the CRS. RS receiving component 318 can receive the CRS from access point 102 and/or passive distributed element 106. Position determining component 322, however, can ignore the CRS for the purposes of determining position of the wireless device 104 based at least in part on the indicator in the assistance data, for example.

In another example, assistance data providing component 402 can set the indicator to a different value. For example, the indicator can be a 1-bit indicator for which one value indicates to only utilize PRSs in determining position while the other value indicates not to only utilize PRSs in determining position. Thus, when assistance data providing component 402 communicates the indicator set to the latter value, RS receiving component 318 can obtain the PRS and CRS(s) described above, and position determining component 406 can discern a position of wireless device 104 based at least in part on the PRS and/or CRS(s). It is to be appreciated, in this example, that assistance data providing component 402 can additionally include location information related to access point 102 in the assistance data. Moreover, this indicator value can be utilized, for example, where passive distributed element 106 is not present such that all RSs in the cell are generated by access point 102 (and thus there is no confusion from passive distributed elements in determining location from RSs, as described).

Referring now to FIGS. 5-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 5:
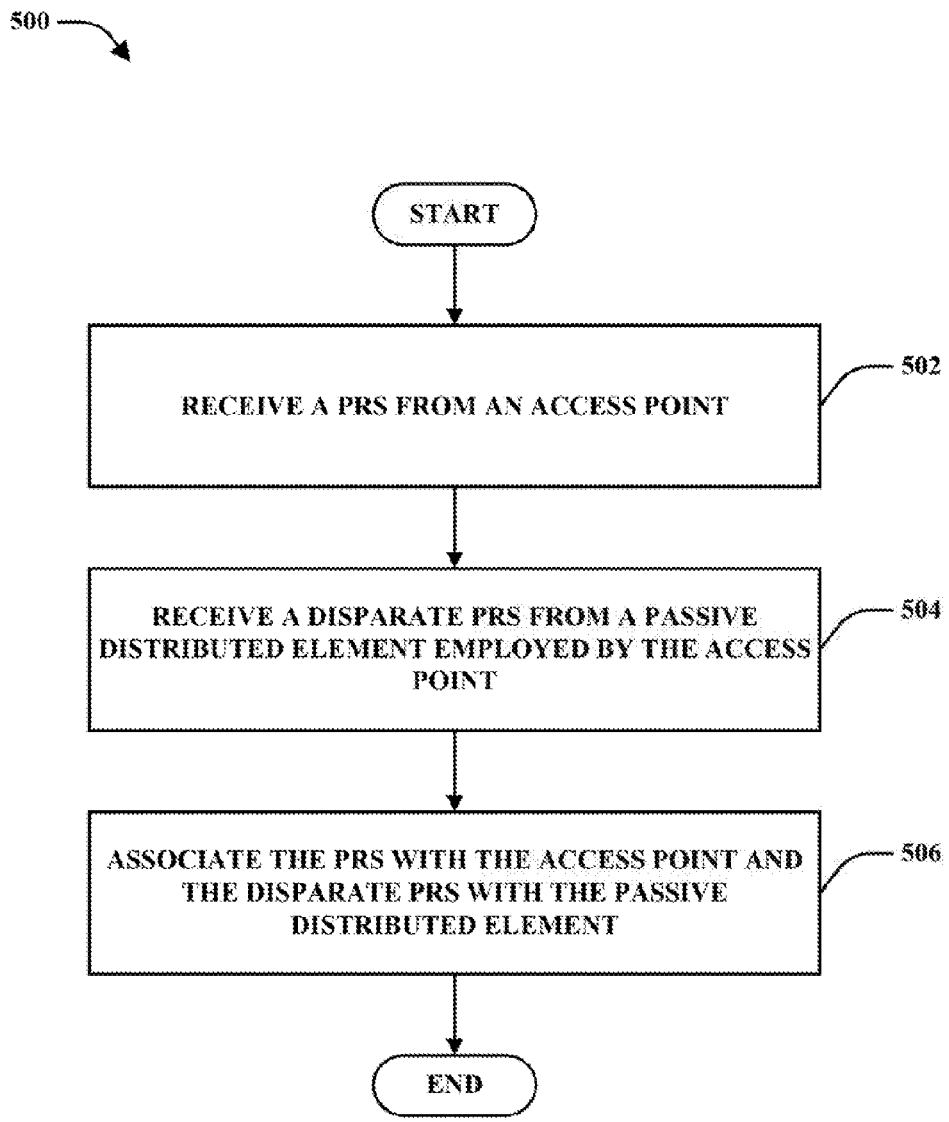
FIG. 5 is a flow diagram of an example methodology that associates PRSs with an access point or a corresponding passive distributed element.

With reference to FIG. 5, illustrated is an example methodology 500 for differentiating between PRSs from access points and passive distributed elements. At 502, a PRS can be received from an access point. At 504, a disparate PRS can be received from a passive distributed element employed by the access point. As described, the PRS differs from the disparate PRS based at least in part on a set of resources over which the PRS and disparate PRS are transmitted/received, symbol sequences comprising the PRS and the disparate PRS, and/or the like, for example. At 506, the PRS can be associated with the access point and the disparate PRS with the passive distributed element. This can be based at least in part on the differences in the PRS (e.g., the associated set of resources, symbol sequence, and/or the like). Once the PRS and disparate PRS are associated with the appropriate nodes, the PRSs can be utilized to compute one or more metrics, such as positioning data, and/or the like. In one example, assistance data can be received that includes parameters for differentiating the PRS of the access point and disparate PRS of the passive distributed element, location of the access point and passive distributed element, and/or the like, as described.

Figure 6:
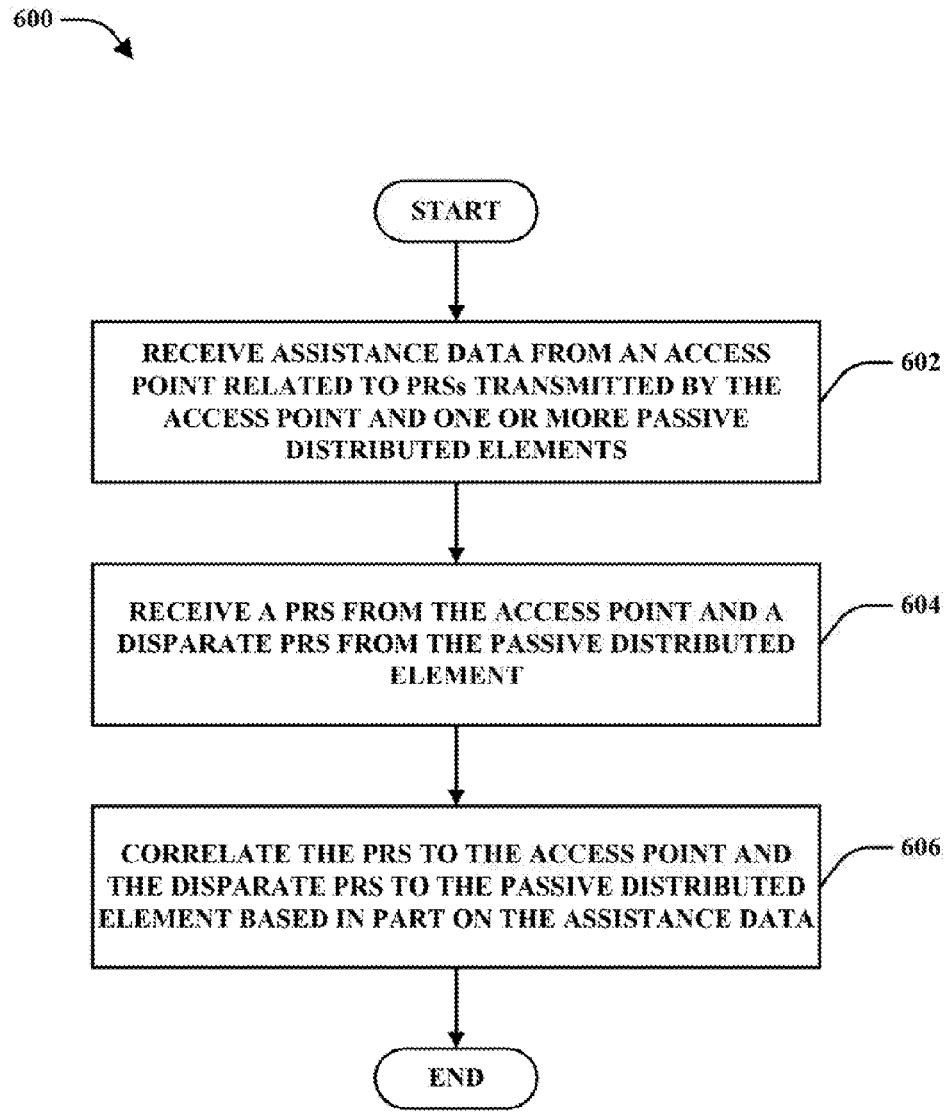
FIG. 6 is a flow diagram of an example methodology that correlates PRSs with access points or passive distributed elements based on assistance data.

Turning now to FIG. 6, an example methodology 600 is shown that facilitates correlating PRSs to access points and passive distributed elements based at least in part on assistance data. At 602, assistance data can be received from an access point related to PRSs transmitted by the access point and one or more passive distributed elements. As described, the passive distributed elements can be utilized by the access point to expand cell coverage. In addition, the assistance data can include one or more parameters related to sets of resources corresponding to PRSs transmitted by the access point and disparate sets of resources corresponding to PRSs transmitted by the passive distributed elements, symbol sequences that comprise the PRS and a disparate symbol sequence that comprise the disparate PRS, a location related to the access point and a disparate location related to at least one of the passive distributed elements, and/or the like, as described. At 604, a PRS can be received from the access point and a disparate PRS from the passive distributed elements. The PRS and disparate PRS can differ over related resources, symbol sequences, etc., as described. Thus, at 606, the PRS can be correlated to the access point and the disparate PRS to the passive distributed element based at least in part on the assistance data.

Figure 7:
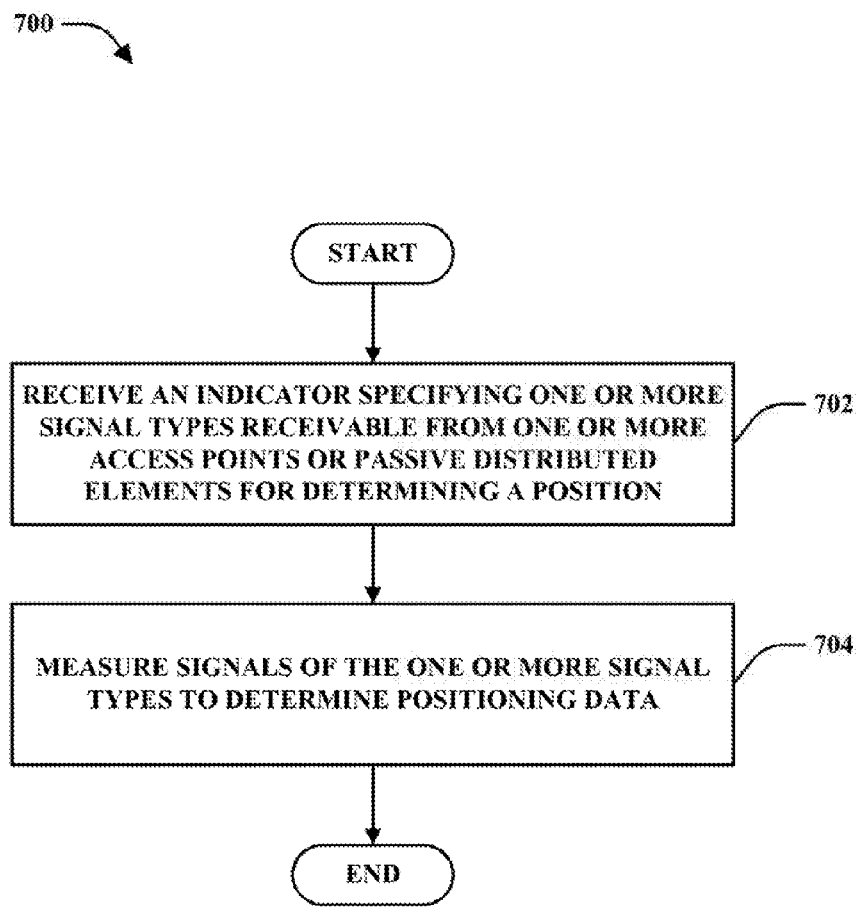
FIG. 7 is a flow diagram of an example methodology that receives an indicator specifying signal types useable for determining a position.

Referring to FIG. 7, an example methodology 700 that facilitates determining signals that can be utilized for computing a position is illustrated. At 702, an indicator can be received specifying one or more signal types receivable from one or more access points or passive distributed elements for determining a position. In an example, passive distributed elements can transmit CRSs related to corresponding access points. Thus, specifying not to use CRSs for positioning (and instead to use only PRSs) can mitigate any resulting confusion. Where an access point does not have passive distributed elements, however, it can indicate that substantially any RS can be utilized to determine positioning. As described, in an example, this can be a 1-bit indicator in assistance data. In any case, at 704, signals of the one or more signal types can be measured to determine positioning data.

Figure 8:
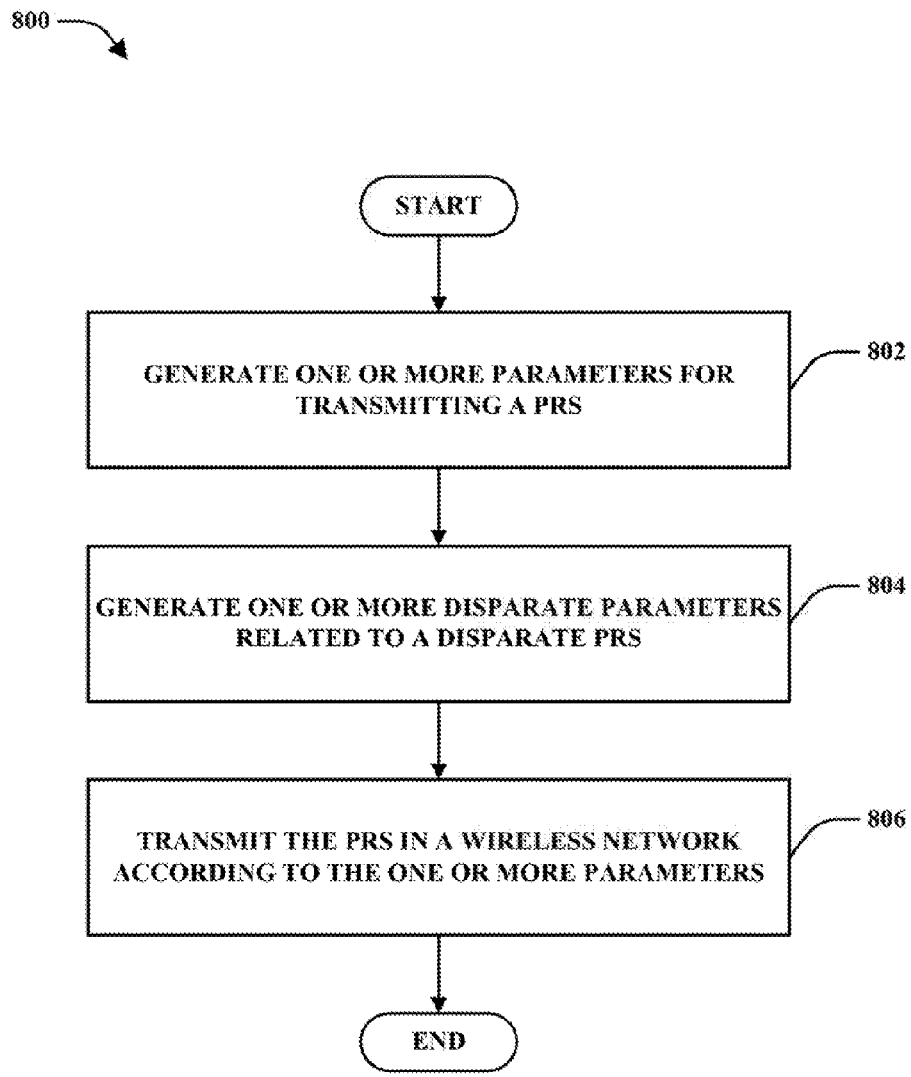
FIG. 8 is a flow diagram of an example methodology that generates a PRS for an access point and a disparate PRS for a related passive distributed element.

Turning now to FIG. 8, an example methodology 800 is shown that facilitates communicating a PRS and a disparate PRS over a passive distributed element. At 802, one or more parameters can be generated for transmitting a PRS. At 804, one or more disparate parameters related to a disparate PRS can be generated. As described, the one or more parameters and one or more disparate parameters can correspond to a set of resources to utilize for transmitting the PRS and a disparate set of resources for the disparate PRS, a symbol sequence to comprise the PRS and a disparate symbol sequence to comprise the disparate PRS, and/or the like. Moreover, for example, the one or more parameters or disparate parameters can be communicated to a wireless device using assistance data (which can also include a location of an access point and of the corresponding passive distributed element, and/or the like). In another example, the one or more disparate parameters related to the disparate PRS can specify not to transmit the disparate PRS or PRS at a passive distributed element. At 806, the PRS can be transmitted in a wireless network according to the one or more parameters. In this regard, as described for example, a wireless device can utilize the PRS (and/or a disparate PRS, where transmitted) for determining a position, for example.

Figure 9:
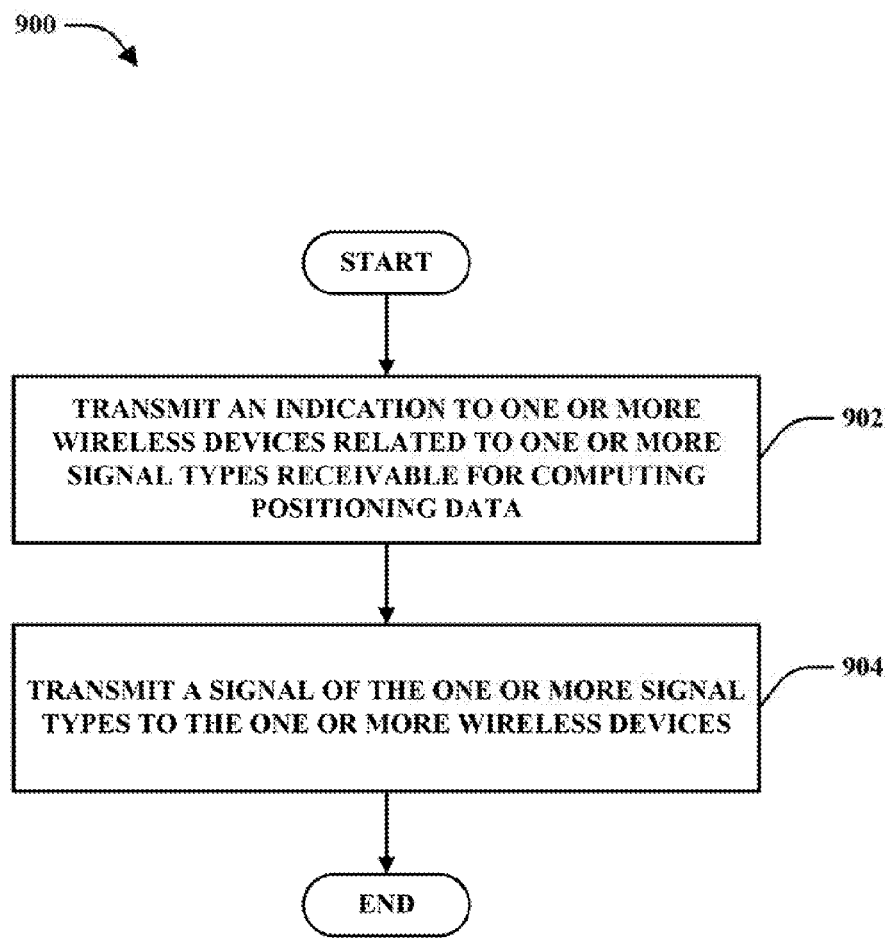
FIG. 9 is a flow diagram of an example methodology that indicates one or more signal types useable for determining a position.

Referring to FIG. 9, an example methodology 900 that facilitates indicating one or more signal types that can be utilized to determine a position is illustrated. At 902, an indication can be transmitted to one or more wireless devices related to one or more signal types receivable for computing positioning data. As described, the indication can be received in assistance data. The indication, for example, can be a 1-bit indicator that specifies whether or not only PRSs should be used for determining a position. At 904, a signal of the one or more signal types can be transmitted to the one or more wireless devices. Thus, the wireless devices can utilize at least the signal for determining a position (e.g., and other signals of the one or more types from other access points or passive distributed elements).

It will be appreciated that, in accordance with one or more aspects described herein, inferences can be made regarding determining resources for transmitting a PRS at an access point and a disparate PRS at a related passive distributed element, generating symbol sequences for the same, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
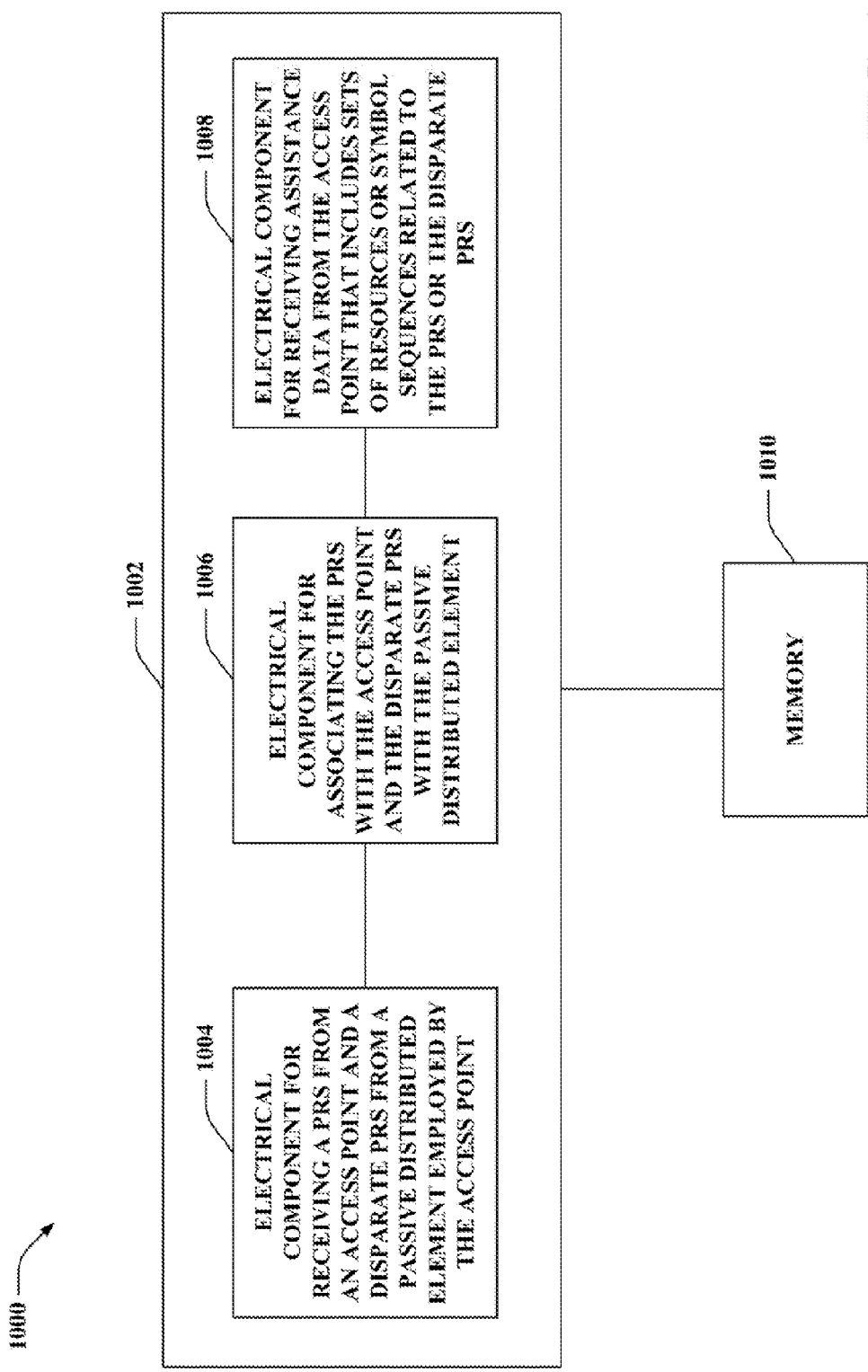
FIG. 10 is a block diagram of an example apparatus that associates PRSs to an access point or related passive distributed element.

With reference to FIG. 10, illustrated is a system 1000 that facilitates differentiating between PRSs sent from an access point and a related passive distributed element. For example, system 1000 can reside at least partially within a base station, mobile device, or another device that provides access to a wireless network. It is to be appreciated that system 1000 is represented as including functional blocks, which can be functional blocks that represent functions implemented by a processor using instructions and/or data retrieved from a computer readable storage medium. System 1000 includes a logical grouping 1002 of electrical components that can act in conjunction. For instance, logical grouping 1002 can include an electrical component for receiving a PRS from an access point and a disparate PRS from a passive distributed element employed by the access point 1004. As described, the PRS and disparate PRS can be received over disparate resources, comprised of disparate symbol sequences, and/or the like. Further, logical grouping 1002 can comprise an electrical component for associating the PRS with the access point and the disparate PRS with the passive distributed element 1006.

As described, for example, electrical component 1006 can associate based at least in part on identifying the different parameters of the PRS and disparate PRS (e.g., the resources, symbol sequence, etc.). Moreover, in this regard, logical grouping 1002 can include an electrical component for receiving assistance data from the access point that includes sets of resources or symbol sequences related to the PRS or the disparate PRS 1008. Additionally, system 1000 can include a memory 1010 that retains instructions and/or data for executing functions associated with electrical components 1004, 1006, and 1008. While shown as being external to memory 1010, it is to be understood that one or more of electrical components 1004, 1006, and 1008 can exist within memory 1010.

Figure 11:
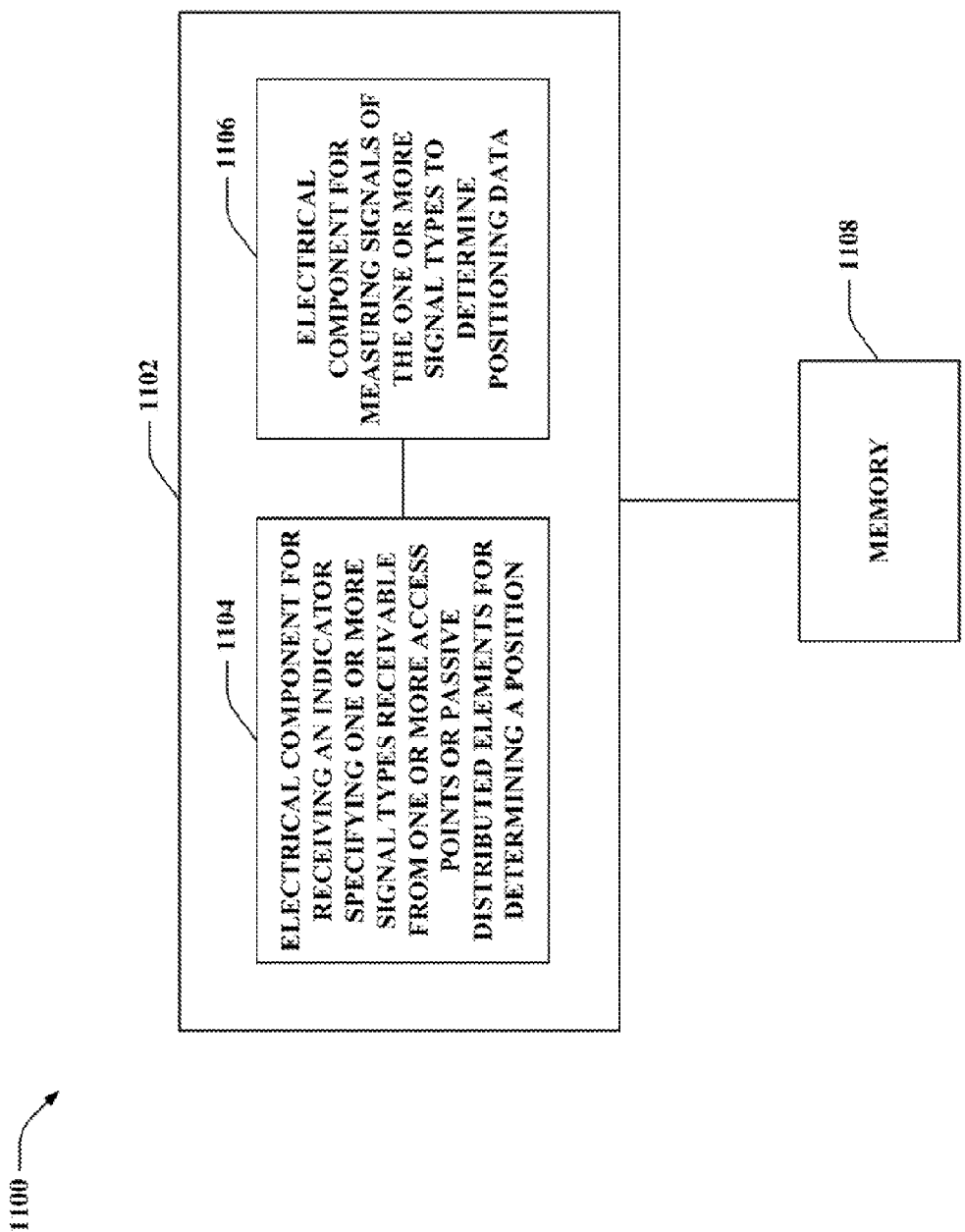
FIG. 11 is a block diagram of an example apparatus that receives an indicator specifying one or more signal types receivable for determining a position.

Now referring to FIG. 11, illustrated is a system 1100 that facilitates determining one or more signal types to utilize for determining positioning. For example, system 1100 can reside at least partially within a base station, mobile device, or another device that provides access to a wireless network. It is to be appreciated that system 1100 is represented as including functional blocks, which can be functional blocks that represent functions implemented by a processor using instructions and/or data retrieved from a computer readable storage medium. System 1100 includes a logical grouping 1102 of electrical components that can act in conjunction. For instance, logical grouping 1102 can include an electrical component for receiving an indicator specifying one or more signal types receivable from one or more access points or passive distributed elements for determining a position 1104.

As described, the indicator can specify whether or not to use only PRSs in determining a position, and thus can be a 1-bit indicator in one example. For example, for access points that utilize passive distributed elements, specifying to only measure PRSs allows the passive distributed elements to not transmit PRSs but still transmit CRS and other RSs without allowing measuring thereof for determining positioning. Further, logical grouping 1102 can comprise an electrical component for measuring signals of the one or more signal types to determine positioning data 1106. Additionally, system 1100 can include a memory 1108 that retains instructions and/or data for executing functions associated with electrical components 1104 and 1106. While shown as being external to memory 1108, it is to be understood that one or more of electrical components 1104 and 1106 can exist within memory 1108.

Figure 12:
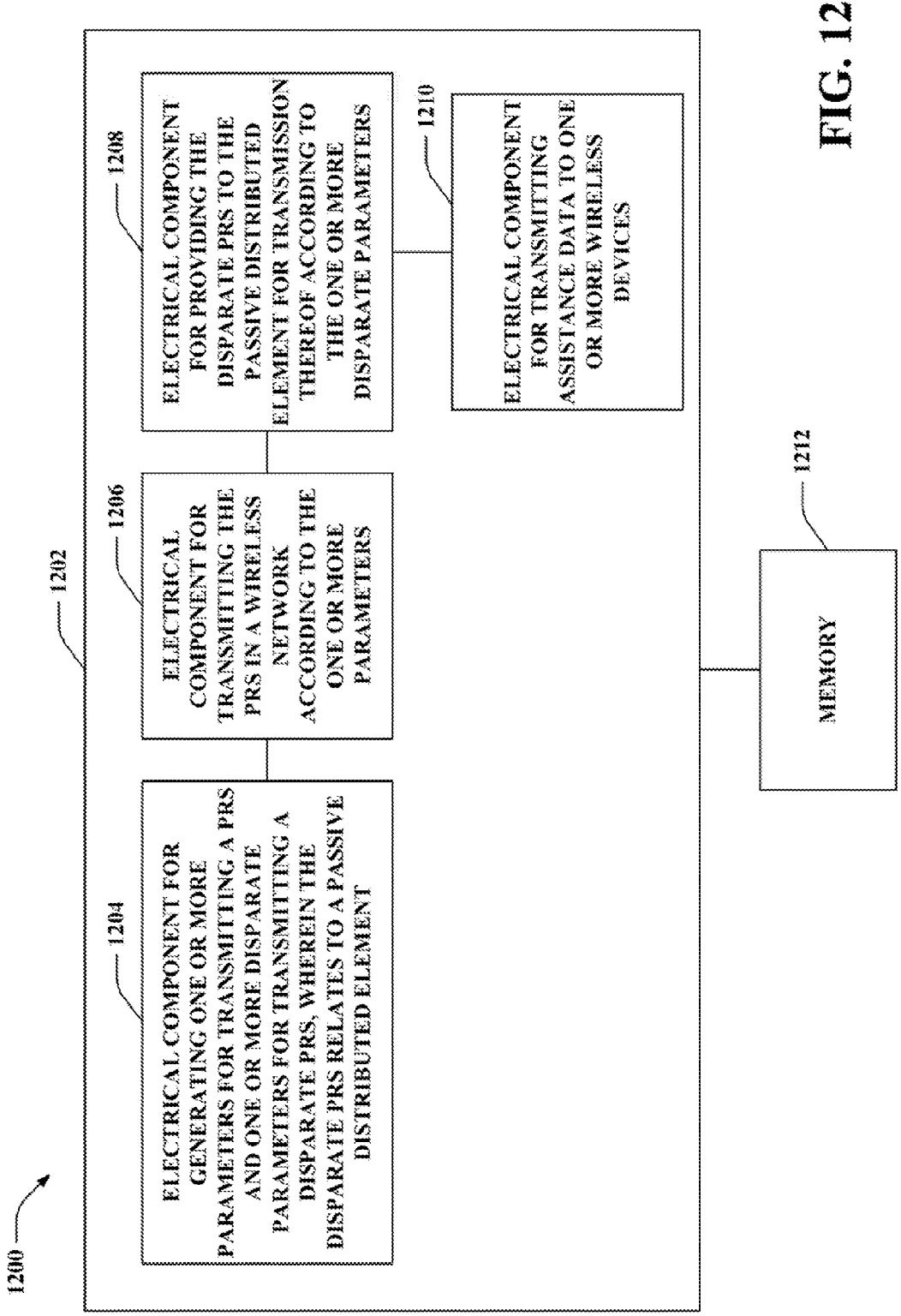
FIG. 12 is a block diagram of an example apparatus that generates a PRS for transmission and a PRS for transmission by a passive distributed element.

With reference to FIG. 12, illustrated is a system 1200 that facilitates transmitting a PRS and causing a passive distributed element to transmit a disparate PRS. For example, system 1200 can reside at least partially within a base station, mobile device, or another device that provides access to a wireless network. It is to be appreciated that system 1200 is represented as including functional blocks, which can be functional blocks that represent functions implemented by a processor using instructions and/or data retrieved from a computer readable storage medium. System 1200 includes a logical grouping 1202 of electrical components that can act in conjunction. For instance, logical grouping 1202 can include an electrical component for generating one or more parameters for transmitting a PRS and one or more disparate parameters for transmitting a disparate PRS, wherein the disparate PRS relates to a passive distributed element 1204. As described, the PRS and disparate PRS can be generated over disparate resources, using disparate symbol sequences, and/or the like. Further, logical grouping 1202 can comprise an electrical component for transmitting the PRS in a wireless network according to one or more parameters 1206.

Moreover, logical grouping 1202 can include an electrical component for providing the disparate PRS to the passive distributed element for transmission thereof according to the one or more disparate parameters 1208. In this regard, a wireless device receiving the PRS and disparate PRS can differentiate between the two (e.g., for determining a position), as described. Furthermore, logical grouping 1202 includes an electrical component for transmitting assistance data to one or more wireless devices 1210. As described, for example, the assistance data can include the sets of resources, symbol sequences, etc., related to the PRS and disparate PRS to facilitate identification thereof, location of the access point and passive distributed element, and/or the like. Additionally, system 1200 can include a memory 1212 that retains instructions and/or data for executing functions associated with electrical components 1204, 1206, 1208, and 1210. While shown as being external to memory 1212, it is to be understood that one or more of electrical components 1204, 1206, 1208, and 1210 can exist within memory 1212.

Figure 13:
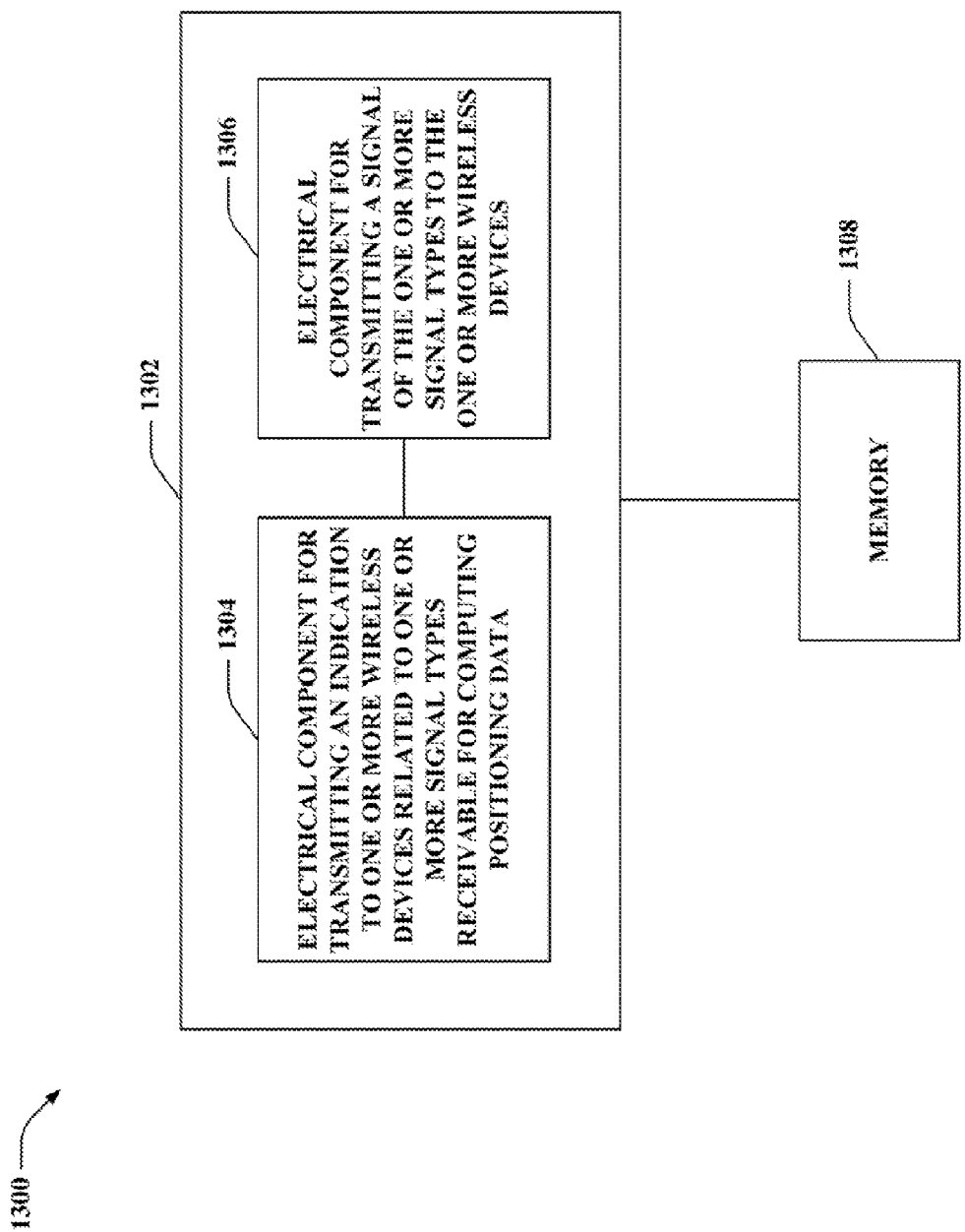
FIG. 13 is a block diagram of an example apparatus that indicates one or more signal types receivable for determining a position.

Now referring to FIG. 13, illustrated is a system 1300 that facilitates indicating one or more signal types useable for determining a position. For example, system 1300 can reside at least partially within a base station, mobile device, or another device that provides access to a wireless network. It is to be appreciated that system 1300 is represented as including functional blocks, which can be functional blocks that represent functions implemented by a processor using instructions and/or data retrieved from a computer readable storage medium. System 1300 includes a logical grouping 1302 of electrical components that can act in conjunction. For instance, logical grouping 1302 can include an electrical component for transmitting an indication to one or more wireless devices related to one or more signal types receivable for computing positioning data 1304.

As described, the indicator can specify whether or not to use only PRSs in determining a position, and thus can be a 1-bit indicator in one example. For example, where system 1300 utilizes passive distributed elements, specifying to only measure PRSs allows the passive distributed elements to not transmit PRSs but still transmit CRS and other RSs without allowing measuring thereof for determining positioning to mitigate confusion resulting from the remotely located passive distributed element transmitting RSs of system 1300. Further, logical grouping 1302 can comprise an electrical component for transmitting a signal of the one or more signal types to the one or more wireless devices 1306. Additionally, system 1300 can include a memory 1308 that retains instructions and/or data for executing functions associated with electrical components 1304 and 1306. While shown as being external to memory 1308, it is to be understood that one or more of electrical components 1304 and 1306 can exist within memory 1308.

Figure 14:
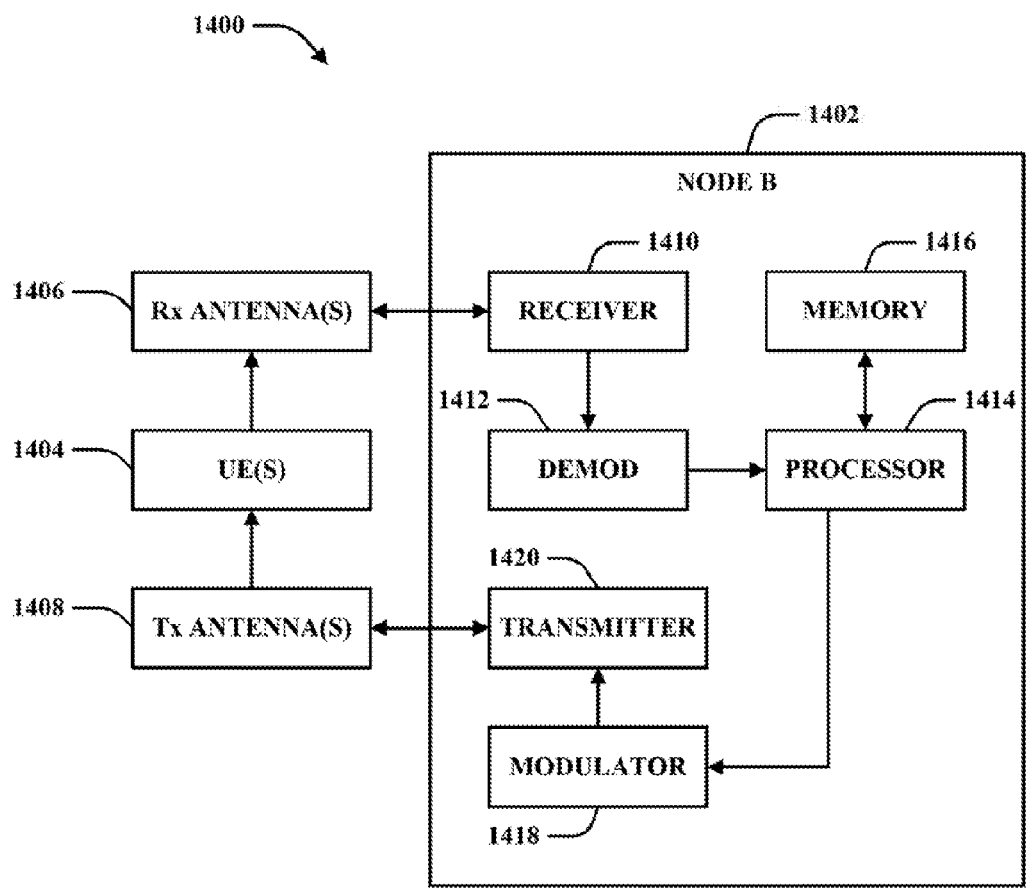
FIGS. 14-15 are block diagrams of example wireless communication devices that can be utilized to implement various aspects of the functionality described herein.

FIG. 14 is a block diagram of a system 1400 that can be utilized to implement various aspects of the functionality described herein. In one example, system 1400 includes a base station or Node B 1402. As illustrated, Node B 1402 can receive signal(s) from one or more UEs 1404 via one or more receive (Rx) antennas 1406 and transmit to the one or more UEs 1404 via one or more transmit (Tx) antennas 1408. Additionally, Node B 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. In one example, Node B 1402 can employ processor 1414 to perform methodologies 500, 600, 700, 800, 900, and/or other similar and appropriate methodologies. Node B 1402 can also include a modulator 1418 that can multiplex a signal for transmission by a transmitter 1420 through transmit antenna(s) 1408.

Figure 15:
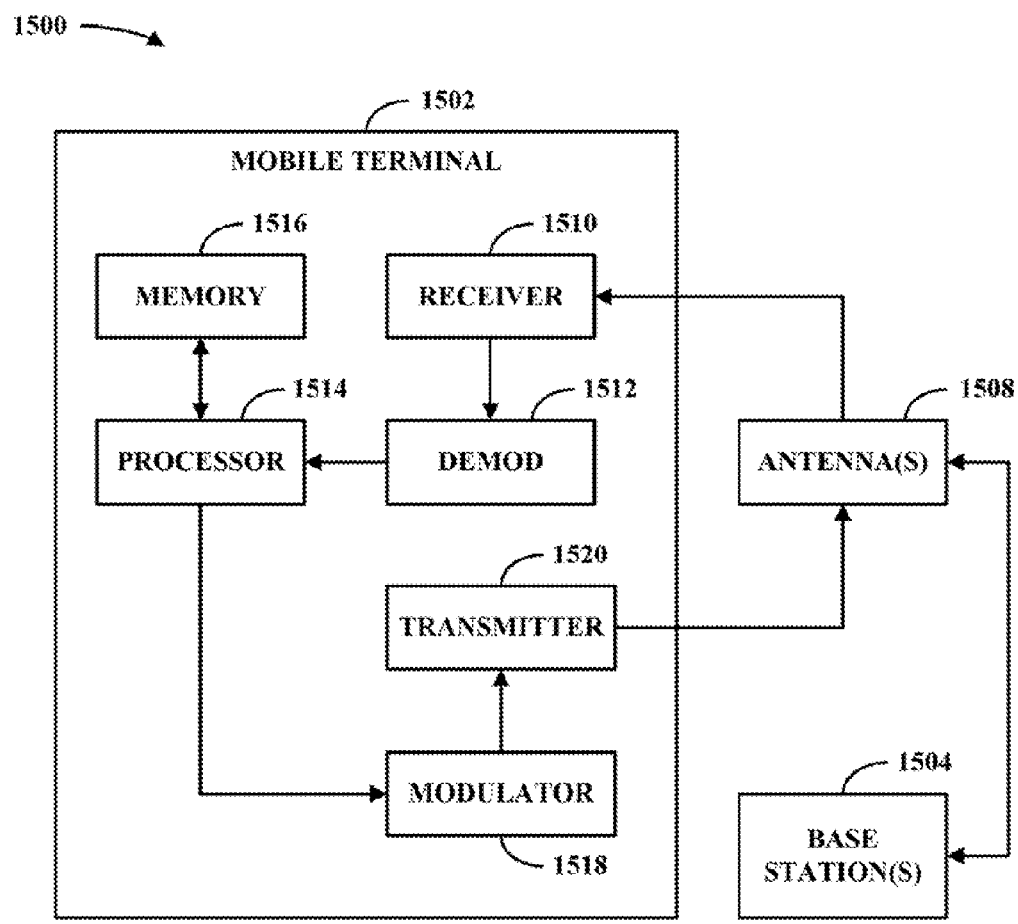

FIG. 15 is a block diagram of another system 1500 that can be utilized to implement various aspects of the functionality described herein. In one example, system 1500 includes a mobile terminal 1502. As illustrated, mobile terminal 1502 can receive signal(s) from one or more base stations 1504 and transmit to the one or more base stations 1504 via one or more antennas 1508. Additionally, mobile terminal 1502 can comprise a receiver 1510 that receives information from antenna(s) 1508. In one example, receiver 1510 can be operatively associated with a demodulator (Demod) 1512 that demodulates received information. Demodulated symbols can then be analyzed by a processor 1514. Processor 1514 can be coupled to memory 1516, which can store data and/or program codes related to mobile terminal 1502. Additionally, mobile terminal 1502 can employ processor 1514 to perform methodologies 500, 600, 700, 800, 900, and/or other similar and appropriate methodologies. Mobile terminal 1502 can also employ one or more components described in previous figures to effectuate the described functionality; in one example, the components can be implemented by the processor 1514. Mobile terminal 1502 can also include a modulator 1518 that can multiplex a signal for transmission by a transmitter 1520 through antenna(s) 1508.

Figure 16:
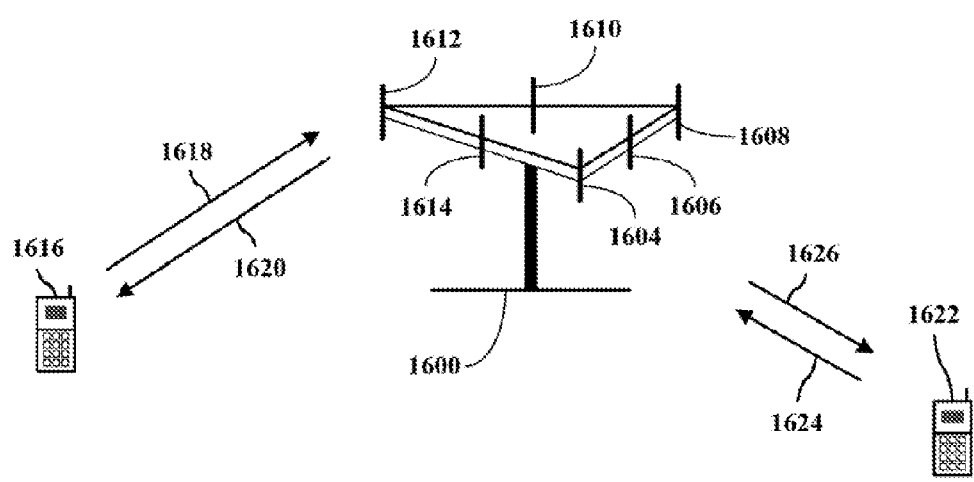
FIG. 16 illustrates an example wireless multiple-access communication system in accordance with various aspects set forth herein.

Referring now to FIG. 16, an illustration of a wireless multiple-access communication system is provided in accordance with various aspects. In one example, an access point 1600 (AP) includes multiple antenna groups. As illustrated in FIG. 16, one antenna group can include antennas 1604 and 1606, another can include antennas 1608 and 1610, and another can include antennas 1612 and 1614. While only two antennas are shown in FIG. 16 for each antenna group, it should be appreciated that more or fewer antennas may be utilized for each antenna group. In another example, an access terminal 1616 can be in communication with antennas 1612 and 1614, where antennas 1612 and 1614 transmit information to access terminal 1616 over forward link 1620 and receive information from access terminal 1616 over reverse link 1618. Additionally and/or alternatively, access terminal 1622 can be in communication with antennas 1606 and 1608, where antennas 1606 and 1608 transmit information to access terminal 1622 over forward link 1626 and receive information from access terminal 1622 over reverse link 1624. In a frequency division duplex system, communication links 1618, 1620, 1624 and 1626 can use different frequency for communication. For example, forward link 1620 may use a different frequency then that used by reverse link 1618.

Each group of antennas and/or the area in which they are designed to communicate can be referred to as a sector of the access point. In accordance with one aspect, antenna groups can be designed to communicate to access terminals in a sector of areas covered by access point 1600. In communication over forward links 1620 and 1626, the transmitting antennas of access point 1600 can utilize beamforming in order to improve the signal-to-noise ratio of forward links for the different access terminals 1616 and 1622. Also, an access point using beamforming to transmit to access terminals scattered randomly through its coverage causes less interference to access terminals in neighboring cells than an access point transmitting through a single antenna to all its access terminals.

An access point, e.g., access point 1600, can be a fixed station used for communicating with terminals and can also be referred to as a base station, a Node B, an access network, and/or other suitable terminology. In addition, an access terminal, e.g., an access terminal 1616 or 1622, can also be referred to as a mobile terminal, user equipment, a wireless communication device, a terminal, a wireless terminal, and/or other appropriate terminology.

Figure 17:
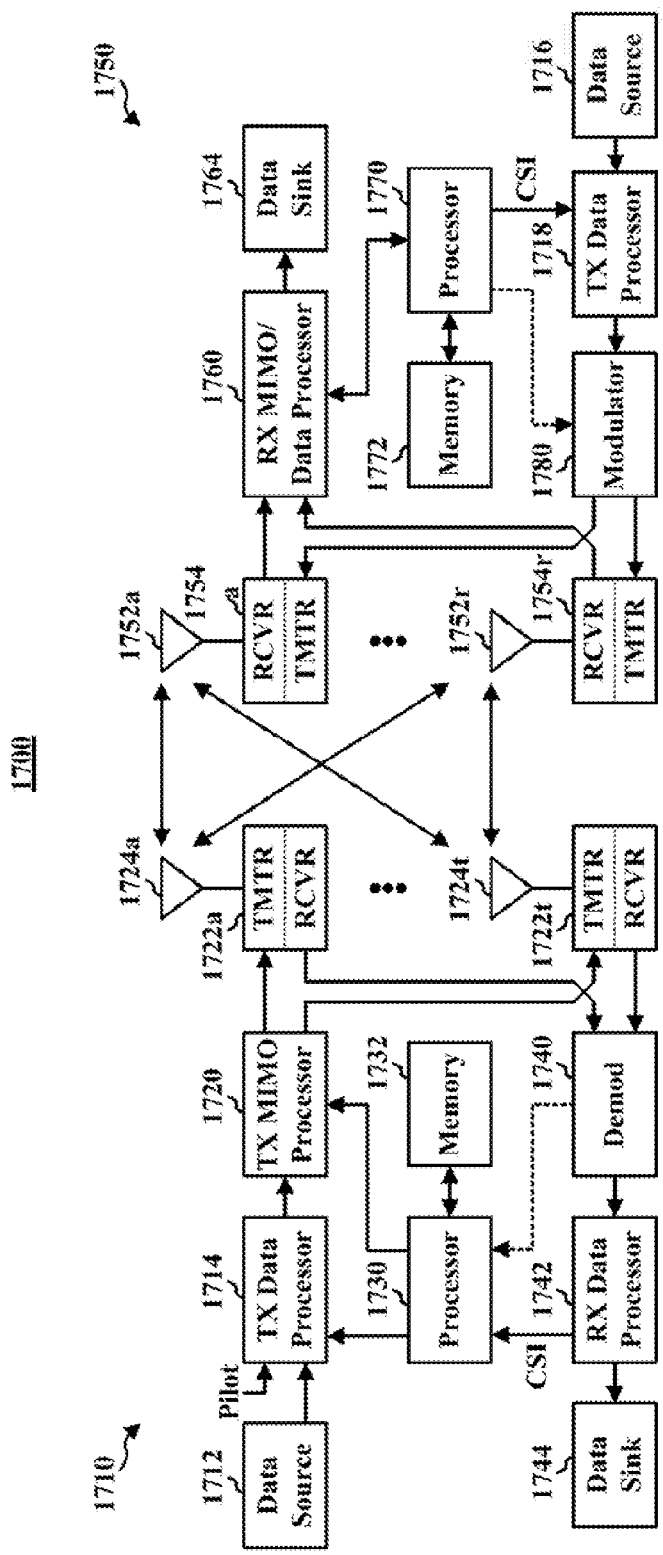
FIG. 17 is a block diagram illustrating an example wireless communication system in which various aspects described herein can function.

Referring now to FIG. 17, a block diagram illustrating an example wireless communication system 1700 in which various aspects described herein can function is provided. In one example, system 1700 is a multiple-input multiple-output (MIMO) system that includes a transmitter system 1710 and a receiver system 1750. It should be appreciated, however, that transmitter system 1710 and/or receiver system 1750 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1710 and/or receiver system 1750 described herein could be utilized in connection with a single output to single input antenna system.

In accordance with one aspect, traffic data for a number of data streams are provided at transmitter system 1710 from a data source 1712 to a transmit (TX) data processor 1714. In one example, each data stream can then be transmitted via a respective transmit antenna 1724. Additionally, TX data processor 1714 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1750 to estimate channel response. Back at transmitter system 1710, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1730.

Next, modulation symbols for all data streams can be provided to a TX MIMO processor 1720, which can further process the modulation symbols (e.g., for OFDM). TX MIMO processor 1720 can then provides $N_T$ modulation symbol streams to $N_T$ transceivers 1722a through 1722t. In one example, each transceiver 1722 can receive and process a respective symbol stream to provide one or more analog signals. Each transceiver 1722 can then further condition (e.g., amplify, filter, and up-convert) the analog signals to provide a modulated signal suitable for transmission over a MIMO channel. Accordingly, $N_T$ modulated signals from transceivers 1722a through 1722t can then be transmitted from $N_T$ antennas 1724a through 1724t, respectively.

In accordance with another aspect, the transmitted modulated signals can be received at receiver system 1750 by $N_R$ antennas 1752a through 1752r. The received signal from each antenna 1752 can then be provided to respective transceivers 1754. In one example, each transceiver 1754 can condition (e.g., filter, amplify, and down-convert) a respective received signal, digitize the conditioned signal to provide samples, and then processes the samples to provide a corresponding "received" symbol stream. An RX MIMO/data processor 1760 can then receive and process the $N_R$ received symbol streams from $N_R$ transceivers 1754 based on a particular receiver processing technique to provide $N_T$ "detected" symbol streams. In one example, each detected symbol stream can include symbols that are estimates of the modulation symbols transmitted for the corresponding data stream. RX MIMO/data processor 1760 can then process each symbol stream at least in part by demodulating, deinterleaving, and decoding each detected symbol stream to recover traffic data for a corresponding data stream. Thus, the processing by RX MIMO/data processor 1760 can be complementary to that performed by TX MIMO processor 1720 and TX data processor 1718 at transmitter system 1710. RX MIMO/data processor 1760 can additionally provide processed symbol streams to a data sink 1764.

In accordance with one aspect, the channel response estimate generated by RX MIMO/data processor 1760 can be used to perform space/time processing at the receiver, adjust power levels, change modulation rates or schemes, and/or other appropriate actions. Additionally, RX MIMO/data processor 1760 can further estimate channel characteristics such as, for example, signal-to-noise-and-interference ratios (SNRs) of the detected symbol streams. RX MIMO/data processor 1760 can then provide estimated channel characteristics to a processor 1770. In one example, RX MIMO/data processor 1760 and/or processor 1770 can further derive an estimate of the "operating" SNR for the system. Processor 1770 can then provide channel state information (CSI), which can comprise information regarding the communication link and/or the received data stream. This information can include, for example, the operating SNR. The CSI can then be processed by a TX data processor 1718, modulated by a modulator 1780, conditioned by transceivers 1754a through 1754r, and transmitted back to transmitter system 1710. In addition, a data source 1716 at receiver system 1750 can provide additional data to be processed by TX data processor 1718.

Back at transmitter system 1710, the modulated signals from receiver system 1750 can then be received by antennas 1724, conditioned by transceivers 1722, demodulated by a demodulator 1740, and processed by a RX data processor 1742 to recover the CSI reported by receiver system 1750. In one example, the reported CSI can then be provided to processor 1730 and used to determine data rates as well as coding and modulation schemes to be used for one or more data streams. The determined coding and modulation schemes can then be provided to transceivers 1722 for quantization and/or use in later transmissions to receiver system 1750. Additionally and/or alternatively, the reported CSI can be used by processor 1730 to generate various controls for TX data processor 1714 and TX MIMO processor 1720. In another example, CSI and/or other information processed by RX data processor 1742 can be provided to a data sink 1744.

In one example, processor 1730 at transmitter system 1710 and processor 1770 at receiver system 1750 direct operation at their respective systems. Additionally, memory 1732 at transmitter system 1710 and memory 1772 at receiver system 1750 can provide storage for program codes and data used by processors 1730 and 1770, respectively. Further, at receiver system 1750, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method of wireless communication, comprising:
   receiving an indicator that specifies a first signal type receivable from one or more access points for determining a position, wherein the first signal type is selected from at least two different signal types for determining the position; and
   measuring, responsive to the indicator, only signals of the first signal type to determine the position while not measuring a second signal type, receivable from a passive distributed element, to determine the position, wherein the passive distributed element is configured by the one or more access points to transmit the second signal type of the at least two different signal types.

2. The method of claim 1, wherein the first signal type comprises positioning reference signals (PRSs).

3. The method of claim 2, wherein the second signal type comprises common reference signals (CRSs).

4. A wireless communications apparatus, comprising:
   at least one processor configured to:
      receive an indicator that specifies a first signal type receivable from one or more access points for determining a position, wherein the first signal type is selected from at least two different signal types for determining the position;
      determine whether received wireless signals were transmitted by the one or more access points or transmitted by a passive distributed element; and
      responsive to a determination that the received wireless signals were transmitted by the one or more access points, measure only signals of the first signal type receivable from the one or more access points; and
   a memory coupled to the at least one processor.

5. The wireless communications apparatus of claim 4, wherein the indicator specifies a positioning reference signal as the first signal type.

6. An apparatus, comprising:
   means for receiving an indicator that specifies a first signal type receivable from one or more access points for determining a position, wherein the first signal type is selected from at least two different signal types for determining the position; and
   means for measuring, responsive to the indicator, only signals of the first signal type to determine the position while not measuring a second signal type, receivable from a passive distributed element, to determine the position, wherein the passive distributed element is configured by the one or more access points to transmit the second signal type of the at least two different signal types.

7. The apparatus of claim 6, wherein the indicator specifies a positioning reference signal as the first signal type.

8. A non-transitory computer-readable medium having program code recorded thereon, the program code comprising:
   program code to receive an indicator that specifies a first signal type receivable from one or more access points for determining a position, wherein the first signal type is selected from at least two different signal types for determining the position; and
   program code to measure, responsive to the indicator, only signals of the first signal type to determine the position while not measuring a second signal type, receivable from a passive distributed element, to determine the position, wherein the passive distributed element is configured by the one or more access points to transmit the second signal type of the at least two different signal types.

9. The non-transitory computer-readable medium of claim 8, wherein the indicator specifies a positioning reference signal as the first signal type.

10. An apparatus, comprising:
    a receiver to receive wireless signals; and
    a processor comprising an assistance data receiving component implemented in the processor, a source determining component implemented in the processor, and a positioning determining component implemented in the processor, wherein
       the assistance data receiving component is configured to process an indicator that specifies a first signal type receivable from one or more access points for determining a position, wherein the first signal type is selected from at least two different signal types for determining the position;
       the source determining component is configured to determine whether received wireless signals were transmitted by the one or more access points or transmitted by a passive distributed element; and
       the position determining component is configured to measure, responsive to a determination that the received wireless signals were transmitted by the one or more access points, only signals of the first signal type receivable from the one or more access points.

11. The apparatus of claim 10, wherein the indicator specifies a positioning reference signal as the first signal type.

12. A method of wireless communication, comprising:
    transmitting, to a wireless device, an indication that specifies a first signal type receivable for determining positioning data, wherein the first signal type is selected from at least two different signal types for determining the position;
    transmitting, to a passive distributed element, an indication to transmit a second signal type of the at least two different signal types; and
    transmitting, to the wireless device, a signal comprising the first signal type for determining the positioning data.

13. The method of claim 12, wherein the first signal type comprises a positioning reference signal.

14. A wireless communications apparatus, comprising:
    at least one processor configured to:
       transmit, to a wireless device, an indication that specifies a first signal type receivable for determining positioning data, wherein the first signal type is selected from at least two different signal types for determining the positioning data;
       transmit, to a passive distributed element, an indication to transmit a second signal type of the at least two different signal types; and transmit, to the wireless device, a signal comprising the first signal type for determining the positioning data; and a memory coupled to the at least one processor.

15. The wireless communications apparatus of claim 14, wherein the first signal type comprises a positioning reference signal.

16. An apparatus, comprising:

means for transmitting, to a wireless device, an indication that specifies a first signal type receivable for determining positioning data, wherein the first signal type is selected from at least two different signal types for determining the positioning data;

means for transmitting, to a passive distributed element, an indication to transmit a second signal type of the at least two different signal types; and means for transmitting, to the wireless device, a signal comprising the first signal type for determining the positioning data.

17. The apparatus of claim 16, wherein the first signal type comprises a positioning reference signal.

18. A non-transitory computer-readable medium having program code recorded thereon, the program code comprising:

program code to transmit, to a wireless device, an indication that specifies a first signal type receivable for determining positioning data, wherein the first signal type is selected from at least two different signal types for determining the positioning data;

program code to transmit, to a passive distributed element, an indication to transmit a second signal type of the at least two different signal types; and program code to transmit, to the wireless device, a signal comprising the first signal type for determining the positioning data.

19. The non-transitory computer-readable medium of claim 18, wherein the first signal type comprises a positioning reference signal.

20. An apparatus, comprising:

a transmitter; and a processor, wherein the transmitter and the processor are together configured:

to transmit, to a wireless device, an indication that specifies a first signal type receivable for determining positioning data, wherein the first signal type is selected from at least two different signal types for determining the positioning data;

to transmit, to a passive distributed element, an indication to transmit a second signal type of the at least two different signal types; and to transmit, to the wireless device, a signal comprising the first signal for determining the positioning data.

21. The apparatus of claim 20, wherein the first signal type comprises a positioning reference signal.

* * * * *